United States Patent [19]
Yoshida

[11] Patent Number: 5,682,248
[45] Date of Patent: Oct. 28, 1997

[54] IMAGE RECEIVING APPARATUS AND METHOD HAVING A FIRST RECORDING MODE AND A SECOND RECORDING MODE

[75] Inventor: Takehiro Yoshida, Tokyo, Japan

[73] Assignee: Canon Kabushiki Kaisha, Tokyo, Japan

[21] Appl. No.: 240,525

[22] Filed: May 10, 1994

[30] Foreign Application Priority Data

May 28, 1993 [JP] Japan .................... 5-151217

[51] Int. Cl.⁶ .................................................. H04N 1/21
[52] U.S. Cl. ................................... 358/404; 358/468
[58] Field of Search ............................. 358/404, 444, 358/401, 403, 438, 435, 436, 434, 439, 468; 395/115, 116

[56] References Cited

U.S. PATENT DOCUMENTS

| | | | |
|---|---|---|---|
| 4,860,110 | 8/1989 | Kokubu | 358/400 |
| 5,019,916 | 5/1991 | Ogura | 358/401 |
| 5,223,948 | 6/1993 | Sakurai et al. | 358/404 |
| 5,241,397 | 8/1993 | Yamada | 358/404 |

*Primary Examiner*—Scott A. Rogers
*Attorney, Agent, or Firm*—Fitzpatrick, Cella, Harper & Scinto

[57] ABSTRACT

A facsimile apparatus includes a memory and a printer. The memory stores images which are sequentially received from a first page. The printer sequentially reads out the images stored in the memory from the last page to record the read out images on sheets when the images for one communication can be stored in the memory. Also, the printer sequentially reads out the images stored in the memory from the first page and records the read out images on sheets to eject the recorded sheets with a faceup state when the images for one communication can not be stored in the memory.

18 Claims, 14 Drawing Sheets

IMAGE RECEIVING APPARATUS AND METHOD HAVING A FIRST RECORDING MODE AND A SECOND RECORDING MODE

BACKGROUND OF THE INVENTION

1. Field of the Invention

The present invention relates to an image receiving apparatus in which received image information can be recorded in a page order which is different from that of the record order.

2. Description of the Related Art

Conventionally, there is proposed a facsimile apparatus in which source information transmitted from senders is received, automatically identified and the classified for every sender. That is, apparatus the received information is classified in accordance with the sender which has transmitted the image information. For instance, the sheets of paper on which two types of image information transmitted from A company and a B company are recorded and stored in first and second bins of a sorter, respectively. In addition, when it is not clear who has transmitted image information, the sheets of paper on which the image information is recorded are stored in a third bin of the sorter.

Recently, there are commercially available many facsimile apparatuses in which an electrophotographic printer, i.e., LBP (Laser beam printer), is employed as a recording section. In this LBP, when received information is recorded on sheets of paper, the recorded sheets are generally ejected in a faceup state because of its mechanism. For this reason, when the image information is received and recorded in normal page order from the first page to the last page, the recorded sheet for the last page is ejected on the recorded sheets already ejected. Therefore, an operator needs to rearrange the page order to distribute the recorded sheets to a destination, resulting in a very troublesome process.

In order to solve this problem, it could be considered that the sheets of paper with the received image information recorded be output in an order reverse to that described above, i.e., in the page order from the last page to the first page. However, when the amount of image information for one communication is too large, all of the image information cannot be fully stored in a memory. As a result, the image information cannot be sequentially read out in reverse page order because the sorting operation cannot be executed in the memory.

In addition, there is another problem in which if the sheets of paper recorded and ejected in the normal page order are mixed with those recorded and ejected in the reverse page order in each bin of the sorter, confusion would be caused in the classification of the recorded sheets.

SUMMARY OF THE INVENTION

The present invention has, as an object, to provide an image receiving apparatus in which the above problems are solved.

Another object of the present invention is to provide an image receiving apparatus which can cope with a special condition in the apparatus in which images sequentially received from the first page can be sequentially recorded from the last page.

Further, another object of the present invention is to provide an image receiving apparatus in which the sheets of paper with the received image information recorded can be classified according to whether the recorded sheets are in a page order from the last page to the first page or in page order from the first page to the last page.

The other objects and features of the present invention will become apparent from the following description and the accompanying drawings.

DESCRIPTION OF THE PREFERRED EMBODIMENTS

Figure 1:
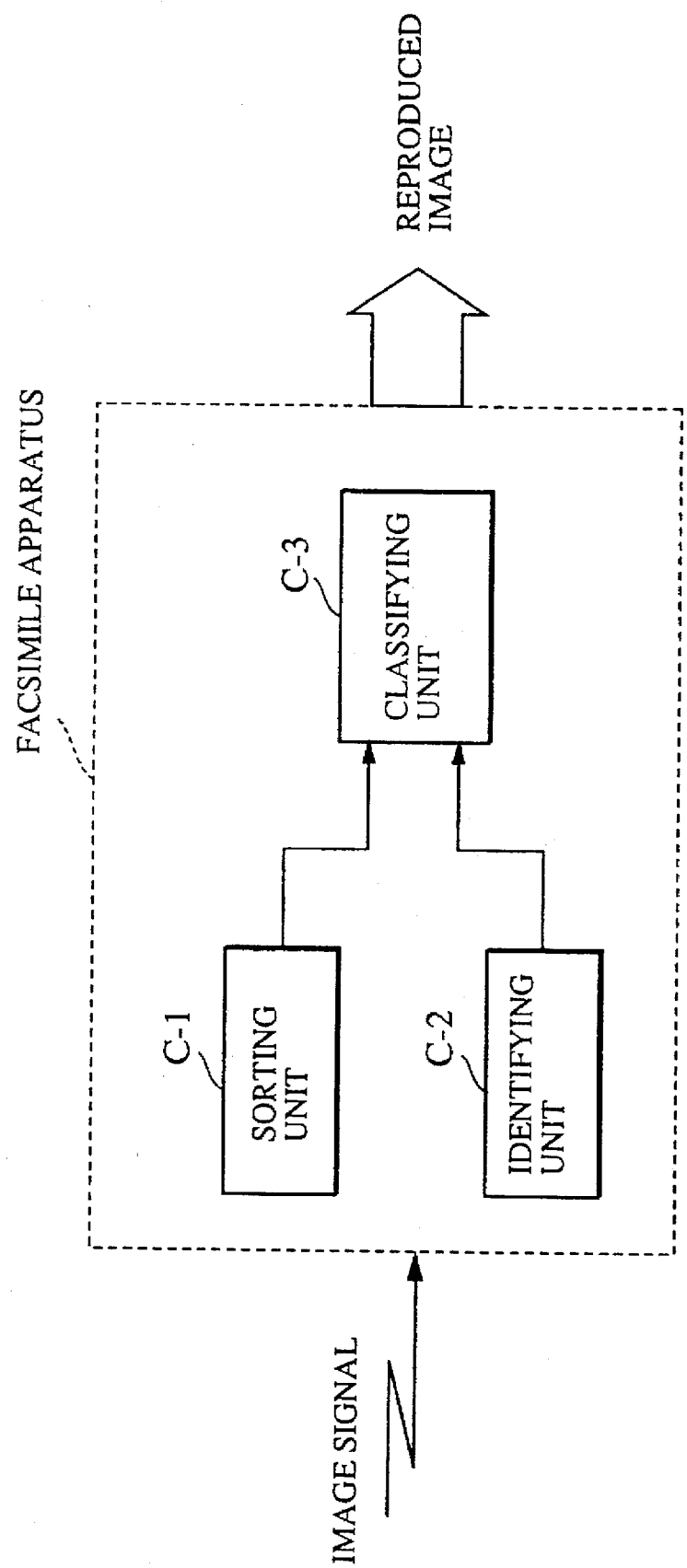
FIG. 1 is a functional block diagram showing the outline of a first embodiment of the present invention.

FIG. 1 is a block diagram showing the outlined structure for achieving a function for classifying and outputting the sheets of paper on which received image information is recorded, in a facsimile apparatus according to a first embodiment of the present invention.

As shown in the figure, the facsimile apparatus includes a unit C-1 for executing a sorting operation, i.e., a software sorting operation by which page order can be changed in reading out of received information stored in an image memory circuit to be described later. The facsimile apparatus also includes an identifying unit C-2 for identifying a communication source, e.g., a sender of the image information, and a classifying unit C-3 for classifying reproduced images for every predetermined communication source in accordance with the outputs from the sorting unit C-1 and the identifying unit C-2.

Figure 2:
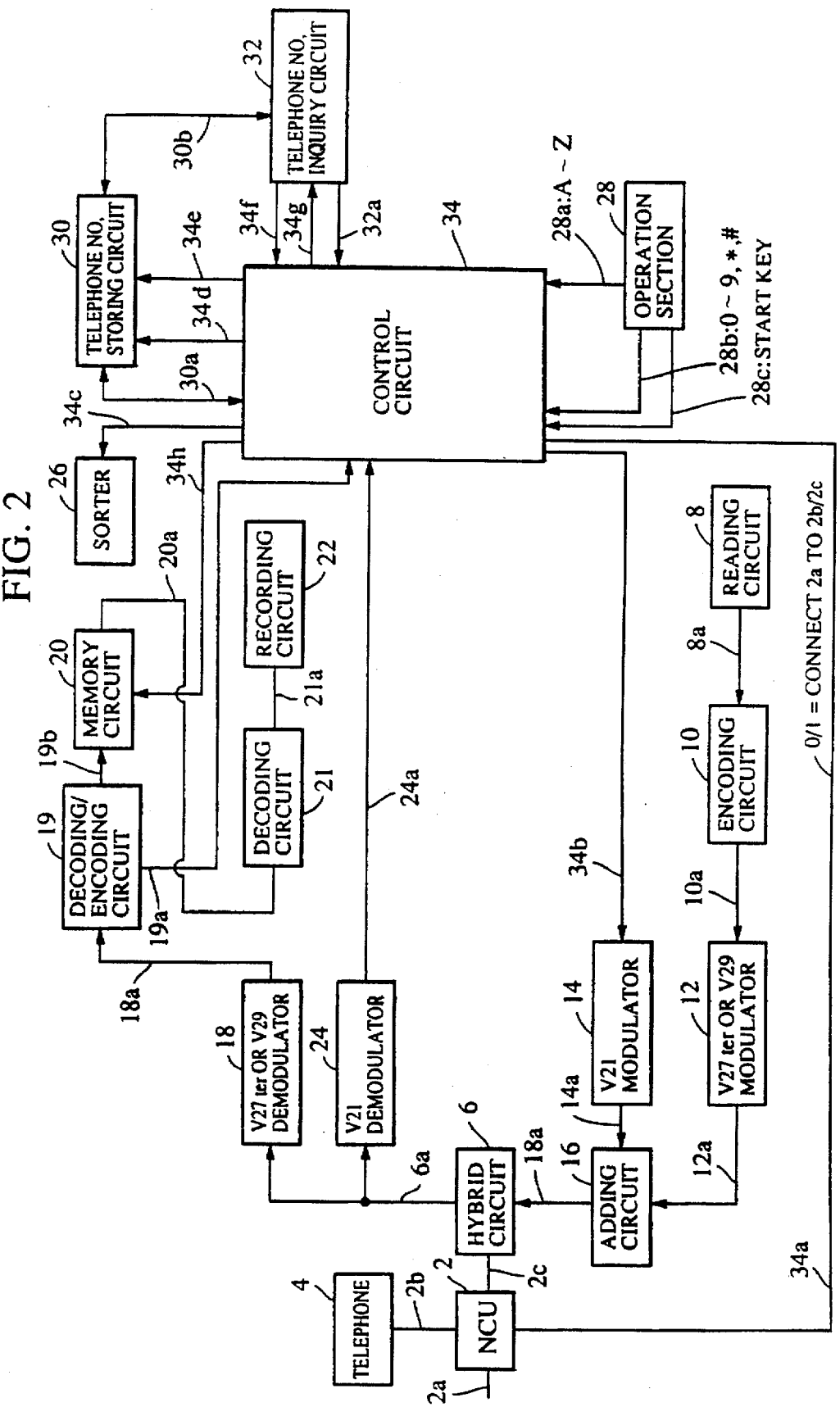
FIG. 2 is a block diagram showing the structure of a facsimile apparatus according to the first embodiment.

FIG. 2 is a block diagram showing the structure of the facsimile apparatus according to the first embodiment of the present invention.

An NCU (network control unit) 2 connects a telephone line to a terminal so that a telephone line network can be used for communication, such as data communication. The NCU 2 controls connection to the telephone line network, switches to a data communication path, or holds a loop. Also, the NCU 2 connects the telephone line 2a to a telephone 4 when a signal level from a control circuit 34 (on a signal 34a) is "0" and connects it to the facsimile apparatus when the signal level is "1". It should be noted that the telephone line 2a is normally connected to the telephone 4.

A hybrid circuit 6 separates signals supplied thereto into a transmission signal and a reception signal. The hybrid circuit 6 transmits the transmission signal from an adding circuit 16, to the telephone line 2a, via the NCU 2 and receives a signal from a source via the NCU 2 to output the same to a V29 demodulator 18 and a V21 demodulator 24 via a signal line 6a.

A reading circuit 8 an image pick up element, such as a CCD (charge coupled device), and an optical system. The reading circuit 8 sequentially reads a transmission manuscript for every line in a main scanning direction to produce a binary image data signal representing white and black portions of the manuscript and transfers the image data signal to an encoding circuit 10 via a signal line 8a. The encoding circuit 10 inputs the image data signal on the signal line 8a to encode the same, i.e., perform the MH or MR coding for the image data signal and outputs the encoding result onto a signal line 10a. A V27 ter or V29 modulator 12 inputs the encoded data signal from the signal line 10a to modulate the same based on the well known CCITT recommendation V27 ter (differential phase modulation) or V29 (orthogonal modulation) and outputs the modulated data signal to the adding circuit 16 via a signal line 12a. A V21 modulator 14 modulates a signal based on the well known CCITT recommendation V21. The V21 modulator 14 modulates a procedure signal from the control circuit 34 (on a signal line 34b) to output the modulated data signal to the adding circuit 16 via a signal line 14a. The adding circuit 16 adds the outputs from the modulators 12 and 14 and the output thereof is sent to the hybrid circuit 6.

The V27 ter or V29 demodulator 18 performs a demodulating operation based on the well known CCITT recommendation V27 ter or V29. The demodulator 18 inputs a modulated image signal from the hybrid circuit 6 and demodulates the image signal to output the demodulated data signal to a decoding/encoding circuit 19 via a signal line 18a. The decoding/encoding circuit 19 inputs the signal on the signal line 18a to decode the same once and outputs the decoded data signal to the control circuit 34 via signal line 19a. The control circuit determines a reception error state based on the decoded data signal. Then, the decoding/encoding circuit 19 performs the MR encoding of k=8 for the correctly received information to output the encoded data signal to a memory circuit 20 via a signal line 19b. The memory circuit 20 stores data of the signal on the signal line 19b under control of the control circuit 34 via a signal line 34h and transmits the stored data to a decoding circuit 21 via a signal line 20a. The decoding circuit 21 performs the MR decoding for the data inputted via the signal line 20a and outputs the decoded data to a recording circuit 22 via a signal line 21a. The recording circuit 22 is an electrophotographic printer, i.e., an LBP (laser beam printer) for inputting the decoded data on the signal line 21a and for sequentially recording a signal representing a white or black portion on sheets of paper for every line to eject the recorded sheets in a faceup state. The recording circuit 22 may be another type of printer, such as an ink jet printer, a thermal printer and a thermal transfer printer. The V21 demodulator 24 performs a demodulating operation based on the well known CCITT recommendation V21. The demodulator 24 input a procedure signal from the hybrid circuit 6 via a signal line 6a to demodulate the same based on the recommendation V21 and outputs the demodulated data signal to the control circuit 34 via a signal line 24a.

A sorter 26 acts to achieve a function for classifying the recorded sheets of paper in accordance with a telephone number of a sender when the software sorting operation is possible. If the sorter 26 is equipped with, for example, ten bins, the classified set of recorded sheets is stored in any one of the ten bins in accordance with the sender's telephone number. More particularly, the sorter 26 inputs a signal on a signal line 34c and ejects the set of recorded sheets to a specific bin designated by the signal on the signal line 34c.

An operation section 28 outputs, when any of alphabet character keys "A" to "Z" is depressed, a signal indicating the depressed key onto a signal line 28a and outputs, when any of numeric keys "0" to "9", a "*" key and a "#" key is depressed, a signal indicating the depressed key on a signal line 28b. Also, the operation section 28 outputs, when a start key is depressed, a signal indicating that the key is depressed, on a signal line 28c.

A telephone number storing circuit 30 is a memory circuit backed up by a battery and stores sender's telephone numbers in correspondence with the bins of the sorter. For instance, assume that a sender's telephone number set for an i-th bin to store a set of recorded sheets is "03-123-1111" and the telephone numbers of another sender set for a j-th bin are "03-123-2222" and "03-123-3333". In this case, in order to store these telephone numbers in the telephone number storing circuit 30, after data of "i*03-123-1111" is output onto a signal line 30a, a write pulse is generated on a signal line 34e. Similarly, after data of "j*03-123-2222*03-123-3333" is output onto the signal line 30a, the write pulse is generated on the signal line 34e. In contrast, to read out a telephone number stored in the telephone number storing circuit 30, after data of a bin number of the sorter, e.g., "i" is output onto the signal line 30a, a read pulse is generated on a signal line 34d. By this, the telephone number of a sender, e.g., "03-123-1111" is outputted onto the signal line 30a for ejecting a set of recorded sheets into the bin having the bin number, e.g., "i".

In the present embodiment, when the software sorting operation is possible, the first to eighth bins of the sorter as counted from the uppermost bin, are assigned with sender's telephone number "L"; "M"; "N"; "O"; "P"; "Q"; "R" or "S"; and "T", "U" or "V" for ejecting sets of recorded sheets of paper, respectively. In a case of another sender's telephone number or no designation of any sender's telephone number, a set of recorded sheets of paper is stored in the ninth bin. When the software sorting operation is impossible for the received information, a set of recorded sheets is stored in the tenth bin with no relation to a sender's telephone number.

When the software sorting operation is possible, the telephone number of a sender is output to a telephone number inquiry circuit 32 via a signal line 30b for storing the recorded sheets of paper in the n-th bin ($1 \leq n \leq 8$, n is an integer) of the sorter 26.

The telephone number inquiry circuit 32 outputs a signal, indicating the number of a bin of the sorter for the recorded sheets of paper to be stored, onto a signal line 32a based on a sender's telephone number on the signal line 34f and a comparison instructing pulse transferred on a signal line 34g. For instance, if the comparison instructing pulse is output on the signal line 34g after the telephone number "L"

is output onto the signal line 34f, inquiry circuit 32 inputs the signal on the signal line 30b and outputs the bin number of "1" for the recorded sheets of paper to be stored, on the signal line 32a based on the sender's telephone number of "L" transferred on the signal line 34f. It should be noted that the signal indicating "9" is output onto the signal line 32a at the time of the generation of the comparison instructing pulse on the signal line 34g when the sender's telephone number transferred on the signal line 34f is not stored in the telephone number storing circuit 30.

The control circuit 34 performs mainly the following control operation in the present embodiment.

The processing will first be described for registering a specific bin number of the sorter and a sender's telephone number corresponding to the specific bin number. For this registration, an operator depresses the "F" key and subsequently the "1" key of the operation section 28 to select a "registration mode". Then, a numeric key for a bin number and the "*" key are depressed. Last, the "F" key is depressed again. As a result, the registration is completed.

For performing the actual facsimile reception, a sender's telephone number is identified in a preprocessing procedure and it is determined in which bin of the sorter the recorded sheets of paper for image being currently received should be stored. When the sender's telephone number is not stored in the telephone number storing circuit 30, or when no sender's telephone number is designated, these recorded sheets are stored in the ninth bin. Although the received information is stored in the memory circuit 20, when all of the information for one communication can be stored in the memory circuit, the information is sequentially read out of the memory circuit 20 from the last page after completion of the communication and recorded on sheets of paper. The recorded sheets of paper are stored in any one of the first to ninth bins, in correspondence to which telephone number has been stored in advance. When all of the information for one communication cannot be stored in the memory circuit, the information is sequentially read out of the memory circuit 20 from the first page at the time when the memory circuit becomes full and recorded on sheets of paper. The recorded sheets of paper are stored in the tenth bin. That is, when all of the information cannot be stored in the memory circuit and the software sorting operation cannot be performed so that the pages cannot be correctly arranged, the recorded sheets of paper are stored in the tenth bin of the sorter.

Figure 3:
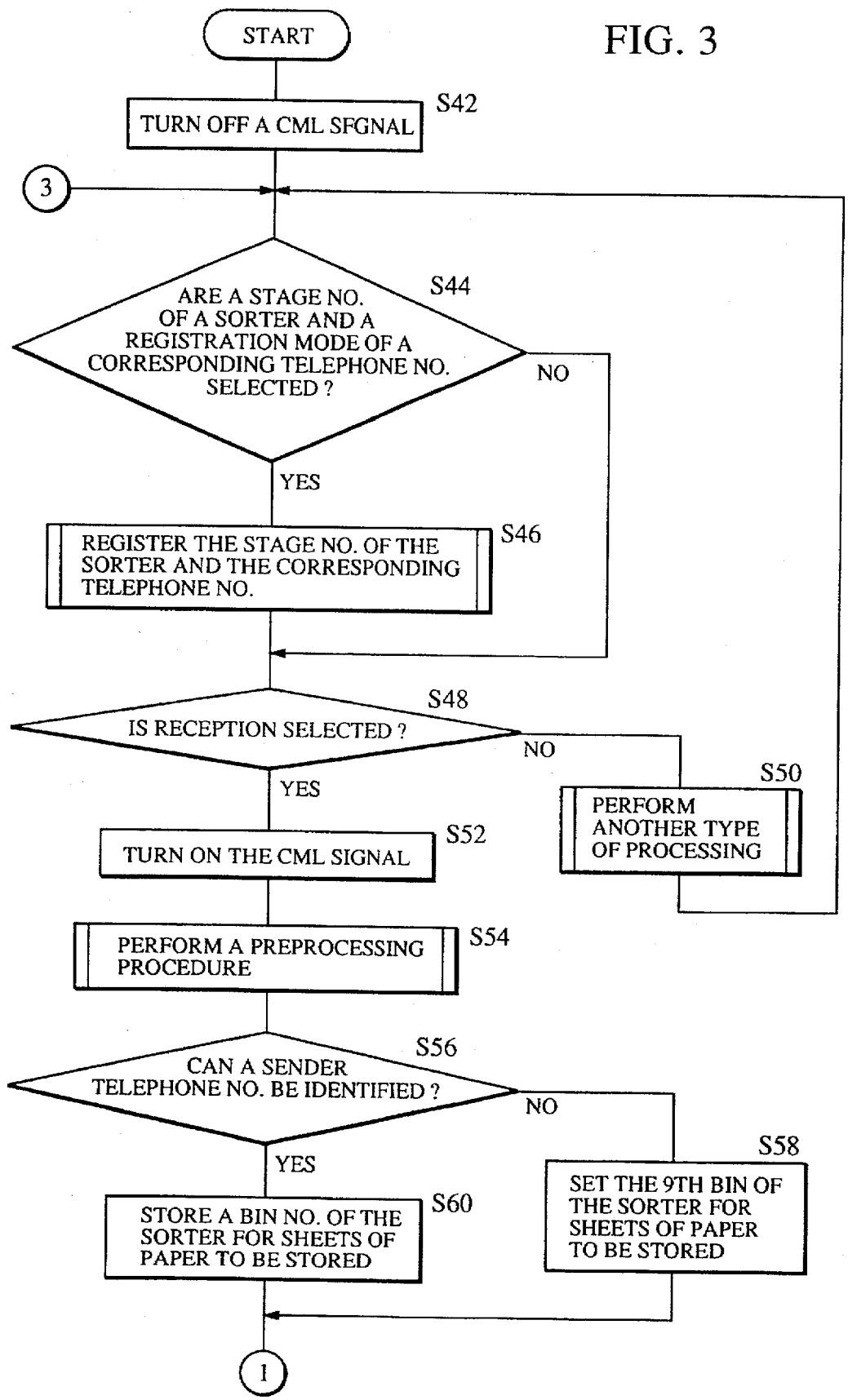
FIG. 3 is a flow chart for explaining an operation of the facsimile apparatus according to the first embodiment.
Figure 4:
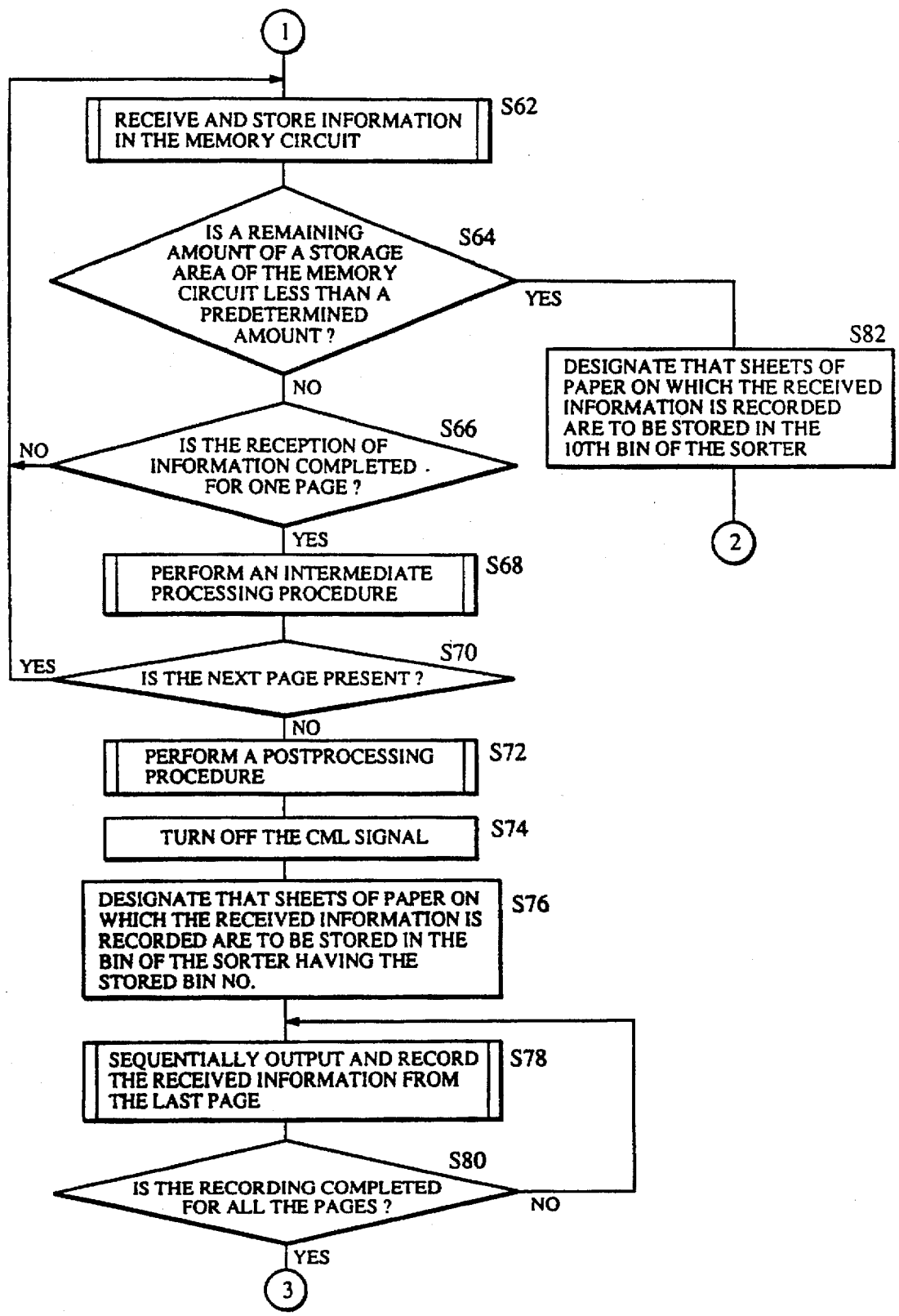
FIG. 4 is a flow chart for explaining the operation of the facsimile apparatus according to the first embodiment.
Figure 5:
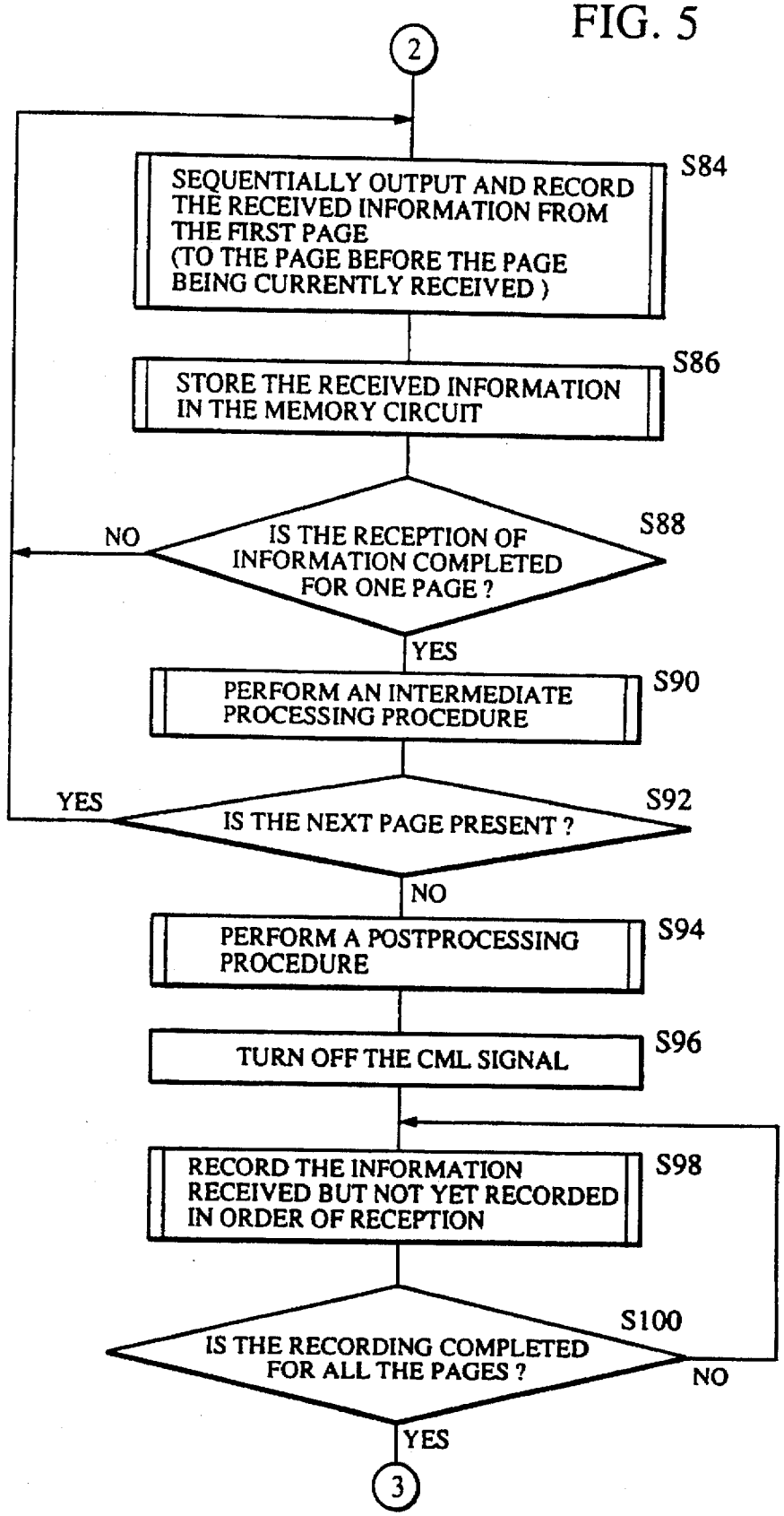
FIG. 5 is a flow chart for explaining the operation of the facsimile apparatus according to the first embodiment.

FIGS. 3 to 5 are flow charts showing a control procedure to be executed by the control circuit 34 in the present embodiment.

First, in a step S42, assume that the signal having a signal level of "0" is outputted onto the signal line 34a so that the telephone line is connected to a telephone, i.e., a CML (Connect Modem to Line) signal is turned off.

Next, in a step S44, whether or not the registration mode (an operation mode in which a sender's telephone number can be registered such that recorded sheets of paper can be stored in a specific bin of the sorter) is selected, i.e., whether the "F" and "1" keys are depressed is determined by inputting the signals on the signal lines 28a and 28b. If the registration mode is determined to be selected for registering the specific state number (bin number) and the sender's telephone number to allow the recorded sheets of paper to be stored in the bin, i.e., the "F" and "1" keys are determined to be depressed, the control proceeds to a step S46. If the registration mode is determined to be not selected for the specific state number (bin number) and the sender's telephone number to allow the recorded sheets of paper to be stored in the bin, i.e., the "F" and "1" keys are determined to be not depressed, the control proceeds to a step S48.

In step S46, the specific state number of the sorter and the sender's telephone number are registered to allow the recorded sheets of paper to be stored in the specific state or bin of the sorter. More particularly, after the stage number of the sorter, e.g., "1" is output onto the signal line 30a, the signal corresponding to the "*" key is output onto the signal line 30a. Then, after the sender's telephone number, e.g., "L" is output onto the signal line 30a for allowing the recorded sheets of paper to be stored in the state of the sorter, the write pulse is generated on the signal line 34e. Thereafter, the control goes to step S48.

In the step S48, it is determined whether or not a facsimile reception mode is set. If the facsimile reception mode is determined to be not set, the control proceeds to a step S50 to perform another type of processing. If the facsimile reception mode is determined to be set, the control proceeds to a step S52. In step S52, the signal having a signal level of "1" is output onto the signal line 34a, i.e., the CML signal is turned on to connect the telephone line to the facsimile apparatus. Then, the control proceeds to a step S54 to perform a preprocessing procedure.

Next, in step S56, it is determined whether or not the sender's telephone number can be identified based on a TSI signal and other signals, i.e., whether or not the sender's telephone number has been registered. If the sender's telephone number can be identified, the control goes to step S60. If the sender's telephone number cannot be identified, the control goes to a step S58.

In the step S58, it is stored that the recorded sheets of paper are to be stored in the ninth bin of the sorter from the top. Then, the control proceeds to step S62.

In the step S60, after the sender's telephone number is output onto the signal line 34f, the comparison instructing pulse is generated on the signal line 34g. Thereafter, the signal is input from the signal line 32a for recognizing which bin the recorded sheets of paper should be stored in. Then, the stage number (bin number) of the sorter is stored as the number of the stage for the recorded sheets of paper to be stored and subsequently the control proceeds to step S62.

In step S62 the received information is stored in the memory circuit 20 via the signal line 34h. In step S64, it is determined whether or not the amount of storage areas remaining in the memory circuit 20 less than a predetermined amount is remaining. If the remaining amount is determined to be less than the predetermined amount, the control proceeds to step S82. On the contrary, if the remained amount is determined not to be less than the predetermined amount, the control proceeds to step S66.

In step S66 it is determined whether or not the reception of the information for one page is completed. If the reception of the information for one page is determined to be completed, the control goes to step S68, while if it is determined not to be completed, the control returns to step S62 to continue the memory circuit storage operation.

In the step S68, an intermediate processing procedure is performed, and in step S70, it is determined whether or not the next page is present. If the next page is determined to be present, the control returns to step S62 to continue the memory circuit storage operation, and if the next page is determined to not be present, the control proceeds to step S72 where a postprocessing procedure is performed.

Next, in step S74, the CML signal is turned off by outputting the signal having the signal level of "0" onto the signal line 34a. In step S76, the bin number, used for storing sheets of paper on which the information received in the step S58 or S60, stored in the memory circuit 20, and recorded, is output and designated on the signal line 34c.

Next, in step S78, the information received via the signal line 34h is sequentially output from the last page so that the information can be recorded in correct page order. In step S80, it is determined whether or not the recording of all the pages is completed. If all the pages are determined to be completely recorded, the control returns to the standby state (step S44) while if all the pages are determined to be not completely recorded, the control returns to step S78 to continue the recording operation.

In step S82, data of "10" is outputted onto the signal line 34c to designate that the recorded sheets of paper are to be stored in the tenth bin of the sorter. In step S84, the information received via the signal line 34h is sequentially outputted and recorded from the first page. That is, in this case the information is output in a page order reverse to the previously described page order. The information is recorded to the page before the page being currently received.

Next, in step S86, the received information via the signal line 34h is stored in the memory circuit 20. Then, it is determined whether or not the reception of information for one page is completed. If the reception of information for one page is determined to be completed, the control proceeds control proceeds to a step S90, and if it is determined to be not completed, the control returns to step S84 to continue the reception of information.

In step S90, an intermediate procedure is performed, and in the next step S92, it is determined whether or not the next page is present. If the next page is determined to be present, the control returns to step S84 to continue the reception of information, and if it is determined to be not present, the control proceeds to step S94.

In step S94, a postprocessing procedure is performed, and then in step S96, the signal having the signal level of "0" is output onto the signal line 34a so that the CML signal is turned off.

Next, in step S98, the information received via the signal line 34h but not yet recorded is recorded in the received page order. In step S100, it is determined whether or not the recording of all the pages is completed. If the recording of all the pages is determined to be completed, the control returns to the standby state (step S44). However, if it is determined to be not completed, the control returns to step S98 to continue the recording operation.

In the above first embodiment, when software sorting operation by the memory circuit 20 is possible, there is switched a bin of the sorter for the sheets of paper with the information recorded to be stored, by identifying the sender's telephone number. However, the bin of the sorter may be switched based on information other than the sender's telephone number, such as a sender's abbreviated name and a sender's subaddress, such that the recorded sheets of paper are stored in the bin.

In addition, the sender's information is compared with preregistered information for identification. This reference may be changed arbitrarily. For instance, the sender's telephone number may be identified by use of all the digits or four lower digits.

Further, a sorter having two types of bins may be provided such that the sheets of paper recorded in the correct order and the sheets of paper of recorded in the order reverse to the correct order are separately stored in the two types of bins, respectively. For instance, when the sorter has ten bins, the ten bins may be assigned to store the sheets of paper on which the information from the senders of "A", "B", "C" and "D" is recorded in the correct order, in the first to fourth bins, respectively; to store the sheets of paper on which the information from the senders of "A", "B", "C" and "D" is recorded in the reverse order, in the fifth to eighth bins, respectively; to store the sheets of paper on which the information from the sender having no registered telephone number or no designation of the telephone number is recorded in the correct order, in the ninth bin; and to store the sheets of paper on which the information from the sender having no registered telephone number or no designation of the telephone number is recorded in the reverse order, in the tenth bin.

Next, a second embodiment will be described below. In the above first embodiment, the recorded sheets which are different to each other in the output page order are classified and stored in different bins of the sorter in accordance with preregistered bin numbers. However, in this second embodiment, the output method is changed in accordance with output page order.

Figure 6:
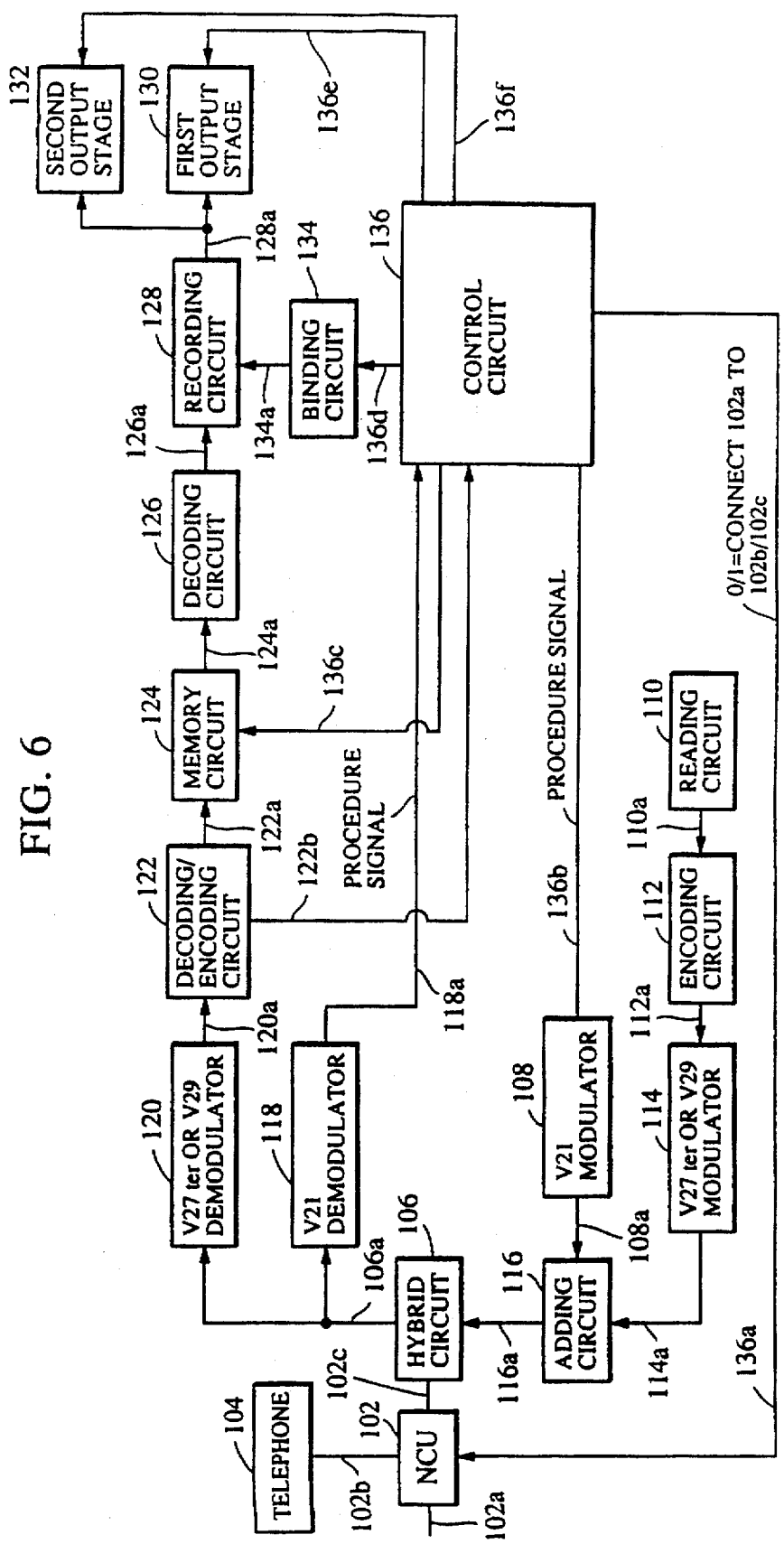
FIG. 6 is a block diagram showing the structure of a facsimile apparatus according to a second embodiment of the present invention.

FIG. 6 is a block diagram showing the structure of the facsimile apparatus according to the second embodiment of the present invention.

An NCU (network control unit) 102 connects a telephone line to a terminal so that a telephone line network can be used for communication such as data communication. The NCU 102 controls the connection to the telephone line network, switches a data communication path, or holds a loop. Also, the NCU 102 connects the telephone line 102a to a telephone 104 when a signal level from a control circuit 136 (on a signal 136a) is "0" and connects it to the facsimile apparatus when the signal level is "1". It should be noted that the telephone line 102b is normally connected to the telephone 104.

A hybrid circuit 106 separates signals into a transmission signal and a reception signal. The hybrid circuit 106 transmits the transmission signal from an adding circuit 116 to the telephone line 102a via the NCU 102 and receives a signal from a transmission source via the NCU 102 to output the same to a V29 demodulator 120 and a V21 demodulator 118 via a signal line 106a.

The V21 modulator 108 demodulates a signal based on the well known CCITT recommendation V21. The modulator 108 modulates a signal procedure signal from the control circuit 136 (on a signal line 136b) to output the modulated signal to the adding circuit 116 via a signal line 108a. A reading circuit 110 consists of an image pick up element, such as a CCD (charge coupled device), and an optical system. The reading circuit 110 sequentially reads a transmission manuscript for every line in a main scanning direction to produce a binary image data signal representing white and black portions and transfers the image data signal to an encoding circuit 112 via a signal line 110a. The encoding circuit 112 inputs the read image data signal on the signal line 110a to encode the same, i.e., to perform the MH or MR coding for the data signal and outputs the encoding result onto a signal line 112a. A V27 ter or V29 modulator 114 inputs the encoded data signal from the signal line 112a to modulate the same based on the well known CCITT recommendation V27 ter (differential phase modulation ) or V29 (orthgonal modulation) and outputs the modulated data signal to the adding circuit 116 via a signal line 114a. The adding circuit 116 adds the outputs from the modulators 108 and 114 and the output thereof is sent to the hybrid circuit 106.

The V21 demodulator 118 performs a demodulation operation based on the well known CCITT recommendation V21. The demodulator 118 inputs a procedure signal from the hybrid circuit 106 via a signal line 106a to demodulate the same based on the recommendation V21 and outputs the demodulated data signal to the control circuit 136 via a signal line 118a. The V27 ter or V29 demodulator 120 performs a demodulating operation based on the well known CCITT recommendation V27 ter or V29. The demodulator 120 inputs a modulated image signal from the hybrid circuit 106 and demodulates the image signal to output the demodulated data signal to a decoding/encoding circuit 122 via a signal line 120a. The decoding/encoding circuit 122 inputs the signal on the signal line 120a to decode the same once and outputs the decoded data signal to the control circuit 136 via a signal line 122b. The control circuit 136 determines a reception error state based on the decoded data signal. Then, the decoding/encoding circuit 122 performs MR encoding of k=8 for the correctly received information to output the encoded data signal to a memory circuit 124 via a signal line 122a. The memory circuit 124 stores data of the signal on the signal line 122a under control of the control circuit 136 via a signal line 136c and transmits the stored data to a decoding circuit 126 via a signal line 124a. The decoding circuit 126 performs MH decoding or MR decoding for the data input via the signal line 124a and outputs the decoded data to a recording circuit 128 via a signal line 126a. The recording circuit 128 is an LBP (an electrophotographic printer) for inputting the decoded data on the signal line 124a and for sequentially recording a signal representing a white or black portion for every line to eject the recorded sheet of paper in the faceup state. The recording circuit 128 may be another type of printer such as an ink jet printer.

A first output stage 130 is for storing sheets of paper on which received information is recorded and stores the recorded sheets when a signal having a signal level of "1" is output on a signal line 136e while does not store the recorded sheets when a signal having a signal level of "0" is outputted on the signal line 136e. A second output stage is also for storing the recorded sheets and stores the recorded sheets when a signal having a signal level of "1" is outputted on a signal line 136f while not storing the recorded sheets when a signal having a signal level of "0" is outputted on the signal line 136f. A binding circuit 134 performs a stapling operation for the recorded and stored sheets of paper via a signal line 134a when a staple instructing pulse is generated on a signal line 136d.

The control circuit 136 performs mainly the following control operation in the second embodiment. First, the control circuit stores received information in the memory circuit 124 once. When all of the information for one communication can be stored in the memory circuit 124, the control circuit 136 sequentially reads out the received information from the memory circuit 124 from the last page in reverse page order. When the recorded sheets of paper can be outputted in the correct page order, the recorded sheets are outputted to the first output stage 130. On the other hand, when all of the information for a single communication cannot be stored in the memory circuit 124, the control circuit 136 reads out the information from the memory circuit 124 only in the reception order of pages so that the recorded sheets are arranged in the reverse page order. In this case the recorded sheets are output to the second stage 132.

Figure 7:
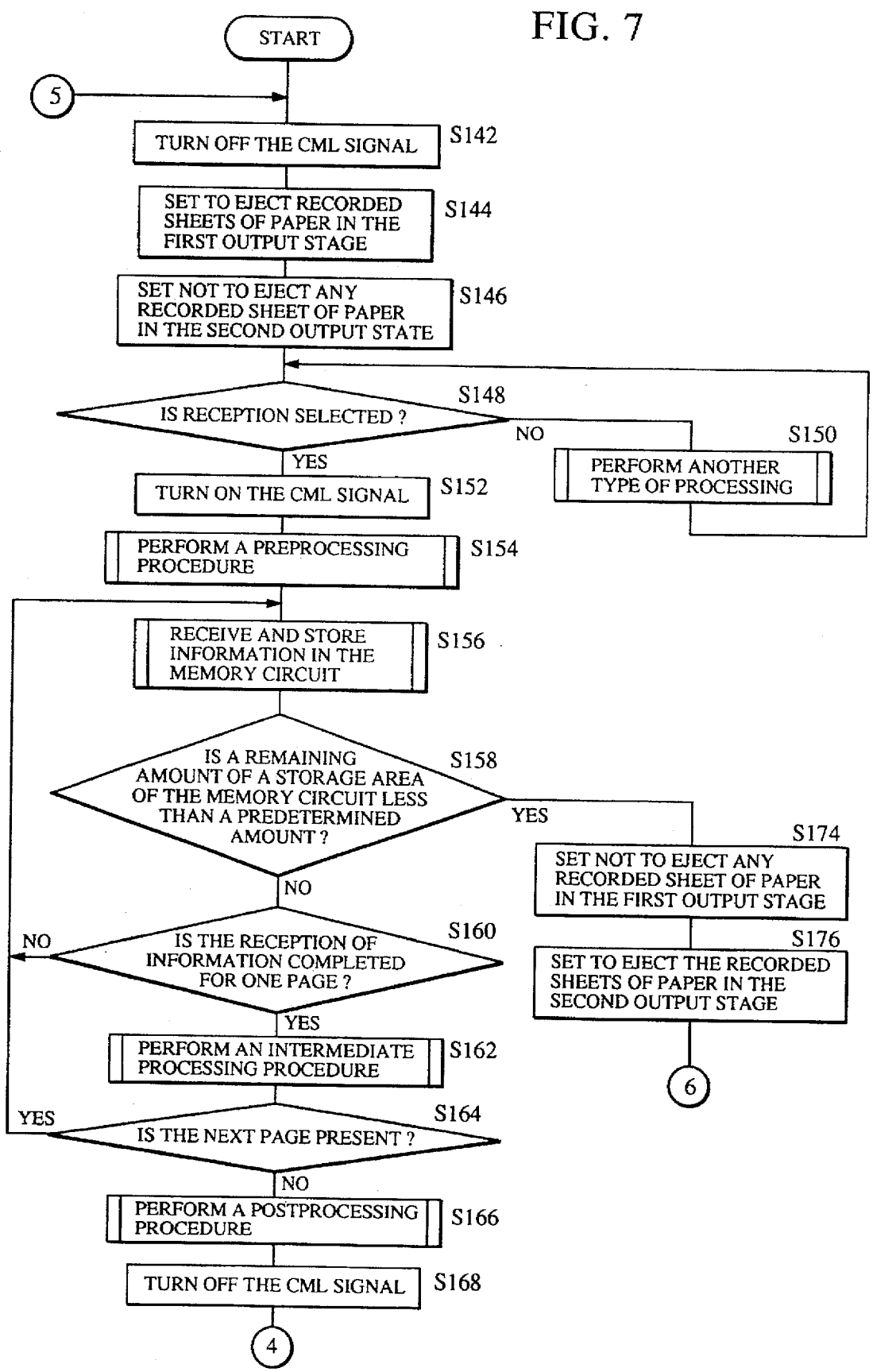
FIG. 7 is a flow chart for explaining the operation of the facsimile apparatus according to the second embodiment.
Figure 8:
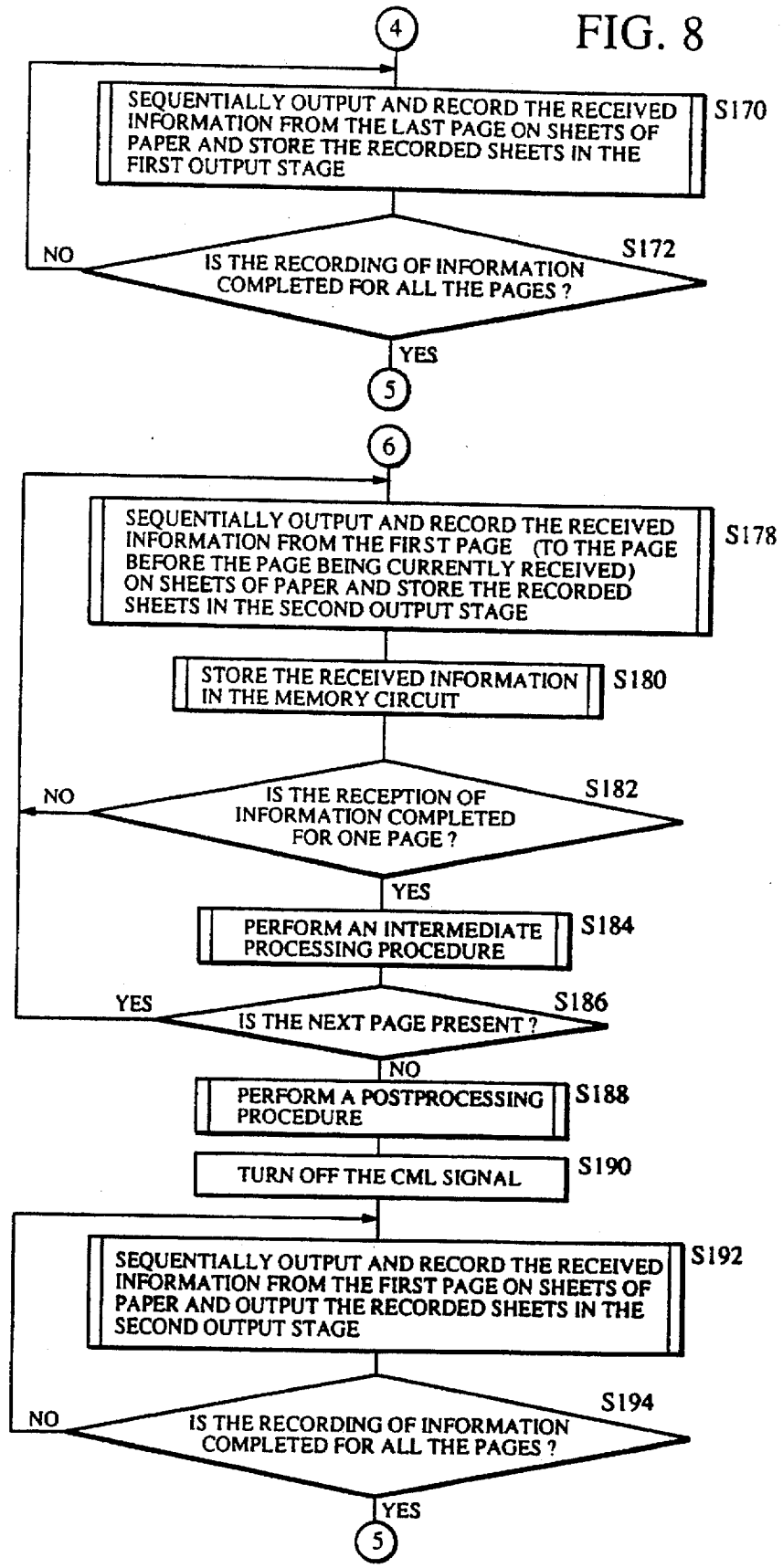
FIG. 8 is a flow chart for explaining the operation of the facsimile apparatus according to the second embodiment.

FIGS. 7 and 8 are flow charts showing a control procedure to be executed by the control circuit 136 in the second embodiment.

First, in step S142, the signal having a signal level of "0" is output onto the signal line 136a so that the CML signal is turned off, and in step S144, the signal having the signal level of "1" is output onto the signal line 136e so that the facsimile apparatus is set such that the recorded sheets are output to the first output stage 130. Further, in step S146, the signal having the signal level of "0" is output onto the signal line 136f so that the facsimile apparatus is set such that the recorded sheets are not output to the second output stage 132.

Next, in step S148, it is determined whether or not the reception is selected. If the reception is determined to be not selected, the control proceeds to step S150 to perform another type of processing. If the reception is determined to be selected, the control proceeds to step S152. In step S152 the signal having a signal level of "1" is outputted onto the signal line 136a so that the CML signal is turned on. Then, in step S154, a preprocessing procedure is performed, and in step S156, the information received via the signal line 136c is stored in the memory circuit 124.

Next, in step S158, it is determined whether or not the amount of storable areas remained in the memory circuit 124 is less than a predetermined amount. If the remained amount is determined to be less than the predetermined amount, the control proceeds to step S174. On the other hand, if the remained amount is determined to be not less than the predetermined amount, the control proceeds to step S160.

In the step S160, it is determined whether or not the reception of the information for one page is completed. If the reception of the information for one page is determined to be not completed, the control returns to step S156 to continue the receiving operation, and if it is determined to be completed, the control proceeds to a step S162 to perform an intermediate processing procedure. Subsequently, in step S164, it is determined whether or not the next page is present. If the next page is determined to be present, the control proceeds to step S156 to continue the receiving operation for the next page. If the next page is determined to be not present, the control proceeds to step S166 where a postprocessing procedure is performed, and then in step S168, the signal having the signal level of "0" is output onto the signal line 136a so that the CML signal is turned off.

Next, in step S170, the received information is sequentially output from the memory circuit 124 from the last page so that the information is recorded by the recording circuit 128. In this case because the recorded information is arranged in the correct page order, the recorded sheets of paper are output to the first output stage 130, as described above.

Next, in a step S172, it is determined whether or not the recording of all the pages stored in the memory circuit 124 is completed. If all the pages are determined to be completely recorded, the control returns to the standby state (the step S142), whereas, if all the pages are determined to be not completely recorded, the control returns to step S170 to continue the recording operation.

In step S174, the signal having the signal level of "0" is output onto the signal line 136e to set the facsimile apparatus such that the recorded sheets are not output to the first output stage 130. In a subsequent step S176, the signal having the signal level of "1" is output onto the signal line 136f to set the facsimile apparatus such that the recorded sheets are output to the second output stage 132.

In step S178, the received information is sequentially output from the memory circuit 124 from the first page and recorded by the recording circuit 128. In this case, because the information is arranged in an order reverse to the previously described order of pages, the recorded sheets are stored in the second output stage 132, as described above. The recording is performed to the page before the page being currently received.

Next, in step S180, the received information via the signal line 136c is stored in the memory circuit 124. Then, in step S182, it is determined whether or not the reception of information for one page is completed. If it is determined that the reception of information for one page is not completed, the control returns to step S178 to continue the reception of information. If it is determined to be completed, the control proceeds to step S184 where an intermediate procedure is performed. In the next step S186, it is determined whether or not the next page is present. If the next page is determined to be present, the control returns to step S178 to continue the reception of information. If it is determined to be not present, a postprocessing procedure is performed in step S188, and then in step S190, the signal having the signal level of "0" is output onto the signal line 136a so that the CML signal is turned off.

Next, in step S192, the received information is sequentially outputted from the memory circuit 124 from the first page and recorded by the recording circuit 128. In this case, because the recorded information is arranged in the reverse order of pages, the recorded sheets are output to the second output stage 132. In step S194, it is determined whether or not the recording of all the pages stored in the memory circuit 124 is completed. If the recording of all the pages is determined to be completed, the control proceeds to step S142, and if it is determined to be not completed the control proceeds to step 192.

As a modification of the above embodiment, the facsimile apparatus may be constructed such that one of two types of sheets of paper, such as white sheets and colored sheets, can be selected so that the user can be informed of the output order of the recorded sheets. More specifically, if the received information can be recorded in the correct order it is recorded on the colored sheets. And on the other hand, if it is recorded in reverse order it is recorded on the white sheets.

In the above second embodiment, two output stages are considered. However, only one output stage may be used as a third embodiment. In this case, by use of the function of binding the received information, if the information for one communication is read out in the reverse page order, i.e., only when the recorded information is arranged in the correct order, the output manuscript is bound.

Figure 9:
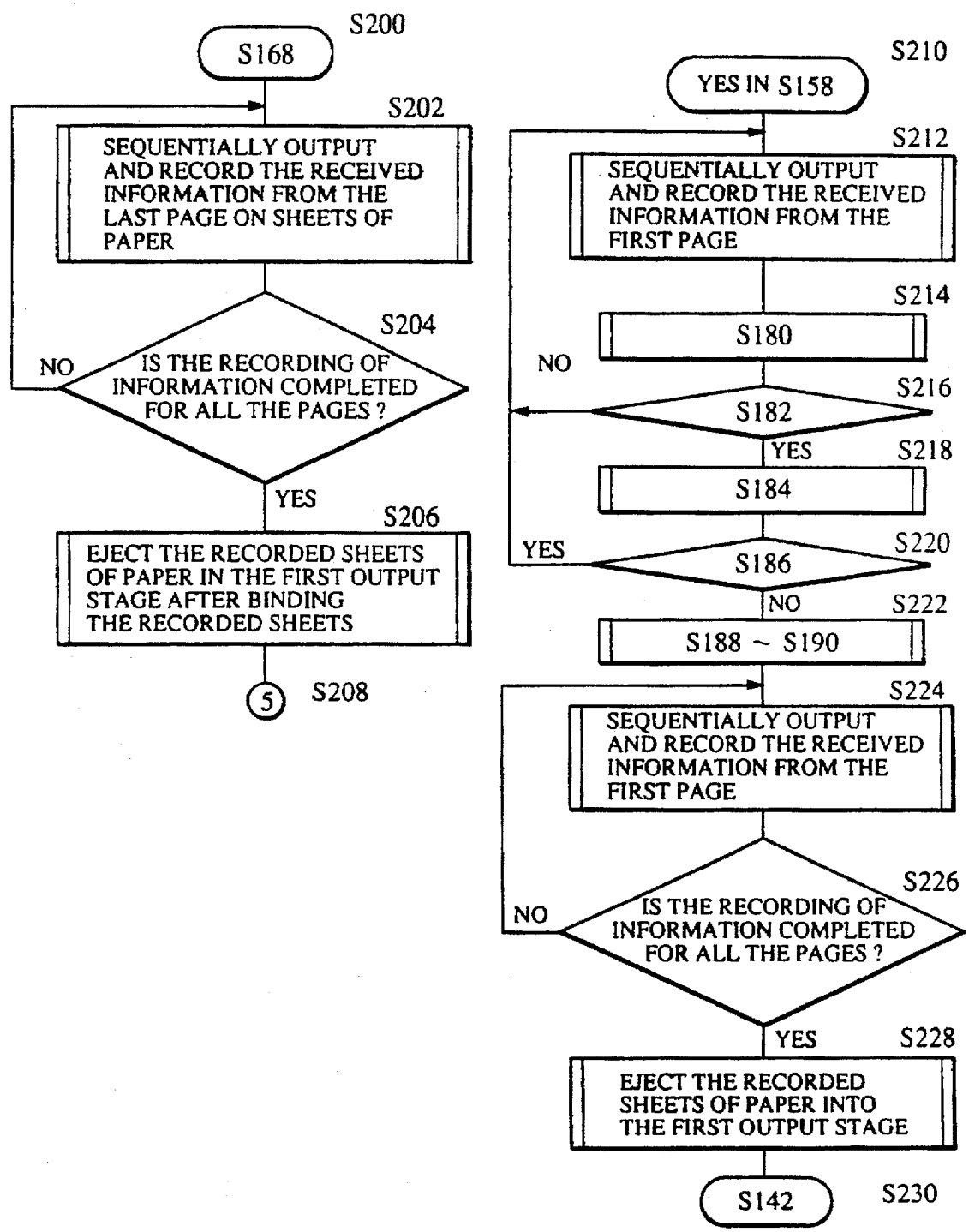
FIG. 9 is a flow chart for explaining the operation of the facsimile apparatus according to a third embodiment of the present invention.

FIG. 9 is a flow chart showing the different portion of the control in the third embodiment from the second embodiment (shown in FIGS. 7 and 8).

Step S200 of FIG. 9 represents the above step 168. In step 202, the received information is sequentially read out of the memory circuit 124 from the last page and recorded. Then, in step S204, it is determined whether or not the recording of all the pages is completed. If the recording of all the pages is determined to be not completed, the control returns to step S202 to continue the recording operation. If all the pages are determined to be completely recorded, the control goes to step S206. In step S206, a bind instruction pulse is generated and output to the binding circuit 134 via the signal line 136d to bind the recorded sheets of paper. Then, the bound sheets are ejected to the first output stage 130. Thereafter, the control proceeds to the standby state (step S142) in step S208.

Step S210 represents the state "YES" in the above step S158. In step S212, the received information is sequentially read out of the memory circuit 124 from the first page and recorded. Step 214 represents the above step S180 to store the received information in the memory circuit 124. Subsequently, in step S216, the determination of the above step S182 is performed. If the reception of information for one page is determined to be not completed, the control returns to step S212 to continue the receiving operation, and if it is determined to be completed, the control proceeds to step S218. Step S218, represents the intermediate processing procedure of the above step S184. Also, step S220 represents step S186, and if the next page is present, the control returns to step S212 to continue the operation for the next page, while if the next page is not present, the control goes to step S222. Step S222, represents steps S188 and S190, and after the postprocessing procedure is performed, the CML signal is turned off.

Next, in a step S224, the received information is sequentially read out of the memory circuit 124 from the first page and recorded. In step S226, it is determined whether or not the recording of all the pages is completed. If all the pages are determined to be not completely recorded, the control returns to step S224 to continue the recording operation. If all the pages are determined to be completely recorded, the control goes to the step S228 to output the recorded sheets of paper to the first output stage 130 without the stapling operation.

In the above third embodiment, the facsimile apparatus may be provided with the function of punching the recorded sheets for filing instead of the stapling function and the punching function may be executed only when the recorded information is arranged in the correct order. By this it is made possible for the user to recognize that the recorded information is arranged in the correct page order or in the reverse page order.

Next a fourth embodiment will be described below.

In a method in which the received information is stored in the memory circuit once such that the software sorting operation is performed and in which the received information is sequentially outputted in the reverse page order, as described above, there is a drawback that it takes a long time to output the received information. For instance, in a case where many slips are to be received, the processing for the received slips delays because the recorded output starts after all the slips are received. Specifically, if there is no linkage or relation between slip pages, the received and recorded slips are preferably outputted as soon as each of the slips is received. In addition, the senders transmitting the slips and the time zone of the transmission are generally fixed in many cases.

The fourth embodiment provides a facsimile apparatus which can effectively cope even with a fixed operation in which many slips are to be received. That is, by specifying the senders and the time zone, the information with no relation between the slips is recorded without performing the software sorting operation as soon as the information for one page is received. In addition, in a case that the sender sends information which has no relation between pages and is preferably recorded as soon as the information is received for one page, if the sender designates such a type of information and informs it to the receiver, the receiver can perform the recording operation without performing the software sorting operation for the received pages.

Figure 10:
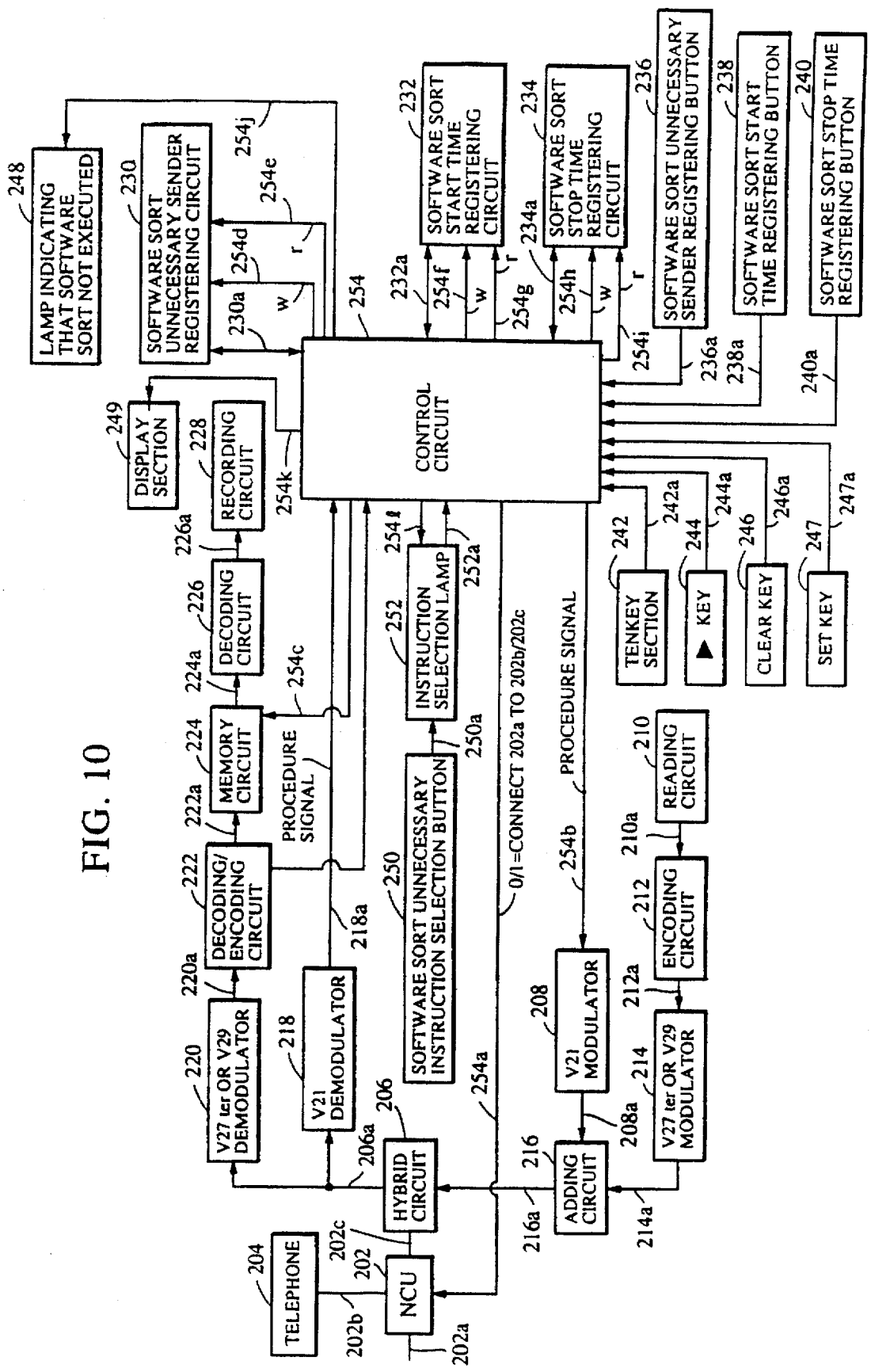
FIG. 10 is a block diagram showing the structure of a facsimile apparatus according to a fourth embodiment of the present invention.

FIG. 10 is a block diagram showing the structure of the facsimile apparatus according to the fourth embodiment of the present invention.

A NCU (network control unit) 202 is connected to a terminal of a telephone line to use a telephone line network for communication such as data communication. The NCU 202 controls connection to the telephone line network, switches to a data communication path, or holds a loop. Also, the NCU 202 connects the telephone line 202a to a telephone 204 when a signal level from a control circuit 254 (on a signal 254a) is "0" and connects it to the facsimile apparatus when the signal level is "1". It should be noted that the telephone line 202b is normally connected to the telephone 204.

A hybrid circuit 206 separates signals into a transmission signal and a reception signal. The hybrid circuit 206 transmits the transmission signal from an adding circuit 216 to the telephone line 202a via the NCU 202 and receives a signal from a destination via the NCU 202 to output the same to a V29 demodulator 220 and a V21 demodulator 218 via a signal line 206a.

A V21 modulator 208 modulates a signal based on the well known CCITT recommendation V21. The V21 modulator modulates a procedure signal from the control circuit 254 (on a signal line 254b) to output the modulated data signal to the adding circuit 216 via a signal line 208a. A reading circuit 210 is constituted of an image pick up element such as a CCD (charge coupled device) and an optical system. The reading circuit 210 sequentially reads a transmission manuscript for one line in a main scanning direction to produce a binary image data signal representing white and black portions and transfers the image data signal to an encoding circuit 212 via a signal line 210a. The encoding circuit 212 inputs the read image data signal on the signal line 210a to encode the same, i.e., perform the MH or MR coding and outputs the encoding result onto a signal line 212a. A V27 ter or V29 modulator 214 inputs the encoded data signal from the signal line 212a to modulate the same based on the well known CCITT recommendation V27 ter (differential phase modulation ) or V29 (orthgonal modulation) and outputs the modulated data signal to the adding circuit 216 via a signal line 214a. The adding circuit 216 adds the outputs from the modulators 208 and 214 and the output thereof is sent to the hybrid circuit 206.

A V21 demodulator 218 performs a demodulation operation based on the well known CCITT recommendation V21. The demodulator 218 inputs a procedure signal from the hybrid circuit 206 via a signal line 206a to demodulate the same based on the recommendation V21 and outputs the demodulated data signal to the control circuit 254 via a signal line 218a. The V27 ter or V29 demodulator 220 performs a demodulating operation based on the well known CCITT recommendation V27 ter or V29. The demodulator 220 inputs a modulated image signal from the hybrid circuit 206 and demodulates the image signal to output the demodulated data signal to a decoding/encoding circuit 222 via a signal line 220a. The decoding/encoding circuit 222 inputs the signal on the signal line 220a to decode the same once and outputs the decoded data signal to the control circuit 254 via signal line 222b. The control circuit 254 determines a reception error state based on the decoded data signal. Then, the decoding/encoding circuit 222 performs the MR encoding of k=8 for the correctly received information to output the encoded data signal to a memory circuit 224 via a signal line 222a. The memory circuit 224 stores data of the signal on the signal line 222a under control of the control circuit 254 via a signal line 254c and transmits the stored data to a decoding circuit 226 via a signal line 224a. The decoding circuit 226 performs the MR decoding for the data input via the signal line 224a and outputs the decoded data to a recording circuit 228 via a signal line 226a. The recording circuit 228 is an LBP (an electrophotographic printer) for inputting the decoded data on the signal line 226a and for sequentially recording a signal representing a white or black portion for every line with a constant speed to eject the recorded sheet of paper with the face-up. The recording circuit 228 may be another type of printer, such as an ink jet printer.

A sender registering circuit 230 is a circuit in which a sender is registered for which the received information is recorded without performing a software sort each time the information is received for one page. In this embodiment, for example, 50 senders can be registered therein as the senders for which it is unnecessary to execute the software sorting operation and each is represented by sender numbers of "00" to "49", respectively. In order to register the senders for which it is unnecessary to execute the software sorting operation in this registering circuit 230, after the sender number (one of the "00" to "49", "00" in this example), a space and the telephone number of the sender (for example, 03-3758-2111) for which it is unnecessary to execute the software sorting operation are output on the signal line 230a, a write pulse is generated on the signal line 254d. As a result, the sender is registered in the registering circuit 230. In order to read out the sender for which it is unnecessary to execute the software sorting operation from the registering circuit 230, after the sender number, e.g., "00", is output on the signal line 230a, a read pulse is generated on the signal line 254e. As a result, the telephone number of the sender for which it is unnecessary to execute the software sorting operation, e.g., "03-3758-2111" corresponding to the sender number, e.g., "00" is outputted on the signal line 230a.

A time registering circuit 232 is a circuit in which a time when the software sorting operation is started is registered. Ten times can be registered therein for example and are represented by time numbers of "00" to "09", respectively. In order to register the time when the software sorting operation is executed or started, after the time number (one of "00" to "09", "00" in this example), a space and the time, e.g., "8:00" are output on the signal line 232a, a write pulse is generated on the signal line 254f. In order to read out the time from the time registering circuit 232, after the time number, e.g., "01" is output on the signal line 232a a read pulse is generated on the signal line 254g. As a result, the time when the software sorting operation is to be started, e.g., "8:00" corresponding to the time number, e.g., "01" is output on the signal line 232a.

A time registering circuit 234 is a circuit in which a time when the software sorting operation is stopped or not executed is registered. Ten times can be registered therein for example and are represented by time numbers of "00" to "09", respectively. In order to register the time when the software sorting operation is stopped or not executed, after the time number (one of the "00" to "09", "01" in this example), a space and the time, e.g., "9:00" are output on the signal line 234a, a write pulse is generated on the signal line 254h. In order to read out the time from the time registering circuit 234, after the time number, e.g., "01" is output on the signal line 234a, a read pulse is generated on the signal line 254i. As a result, the time when the software sorting operation is to be started, e.g., "9:00" corresponding to the time number, e.g., "01" is output on the signal line 234a.

A sender registering button 236 is used to register a sender for which it is unnecessary to execute the software sorting operation and if the button 236 is depressed a depression pulse is generated on the signal line 236a. A time registering button 238 is used to register a time when the software sorting operation is started or executed and if the button 238 is depressed a depression pulse is generated on the signal line 238a. A time registering button 240 is used to register a time when the software sorting operation is stopped or not executed and if the button 240 is depressed a depression pulse is generated on the signal line 240a. A ten key section 242 includes keys of "0" to "9", a "*" key and a "#" key and if any one key of the ten key section 242 is depressed information of the depressed key is outputted onto the signal line 242a. An arrow mark key 244 is used to make the next information display on the display section 249 and if the arrow mark key 244 is depressed a depression pulse is generated on the signal line 244a. A clear key 246 is used to clear various types of setting and if the key 246 is depressed a depression pulse is generated on the signal line 246a. A set key 247 is used to ensure various inputs and if the key 247 is depressed a depression pulse is generated on the signal line 247a.

A display lamp 248 is a lamp for indicating that the software sorting operation is not executed upon reception of information. When this lamp 248 is turned on, the software sorting operation is not executed and the received information is recorded each time the information is received for every page. More particularly, the display lamp 248 is turned off when a signal having a signal level of "0" is outputted on the signal line 254j and is turned on when the signal having a signal level of "1" is outputted on the signal line 254j. A display section 249 inputs a signal on a signal line 254k to display it.

A selection button 250 is a button selected for instructing that the software sorting operation is not executed in a transmission mode and if this button is depressed a depression pulse is generated on a signal line 250a. A selection lamp 252 is first turned off when the clear pulse is generated on the signal line 2541 and thereafter the lamp 252 toggles between on and off each time the depression pulse is generated on the signal line 250a. When this lamp 252 is turned off, a signal having a signal level of "0" is outputted on a signal line 252a, and when the lamp is turned on, the signal having a signal level of "1" is outputted on the signal line 252a.

The control circuit 254 control to store the received information in the memory circuit and sequentially output the received information from the memory circuit in a reverse order when the information is stored in the memory circuit for one communication. However, when information is received for slips having no relation therebetween, the information is preferably recorded each time the information is received for every page so that the information can be output and processed immediately. The control circuit 254 controls to register a sender from which the information is sent as a sender unnecessary to execute the software sorting operation. As a result, the information is recorded each time the information is received for one page only when the information is received from the sender.

Figure 11:
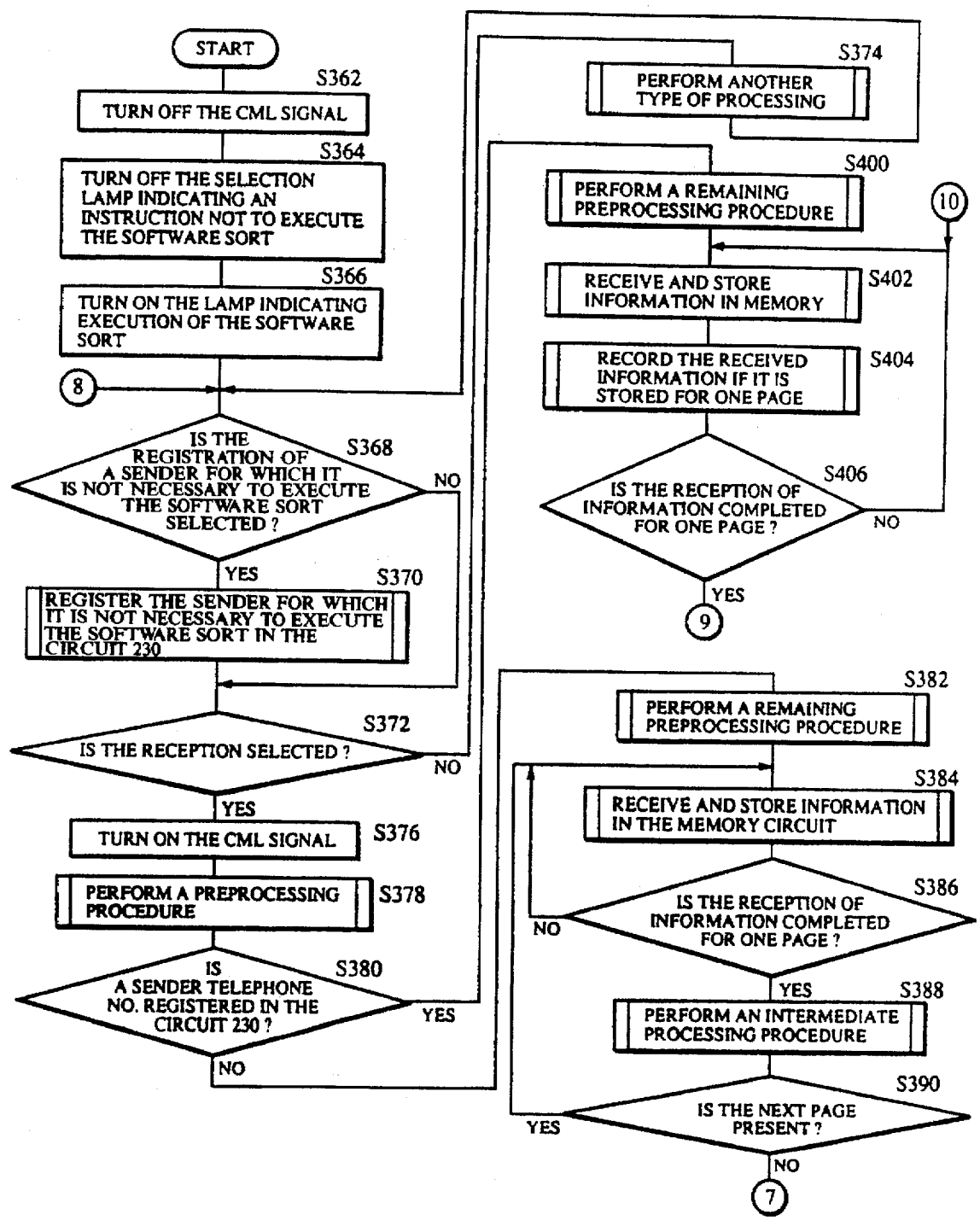
FIG. 11 is a flow chart for explaining the operation of the facsimile apparatus according to the fourth embodiment.
Figure 12:
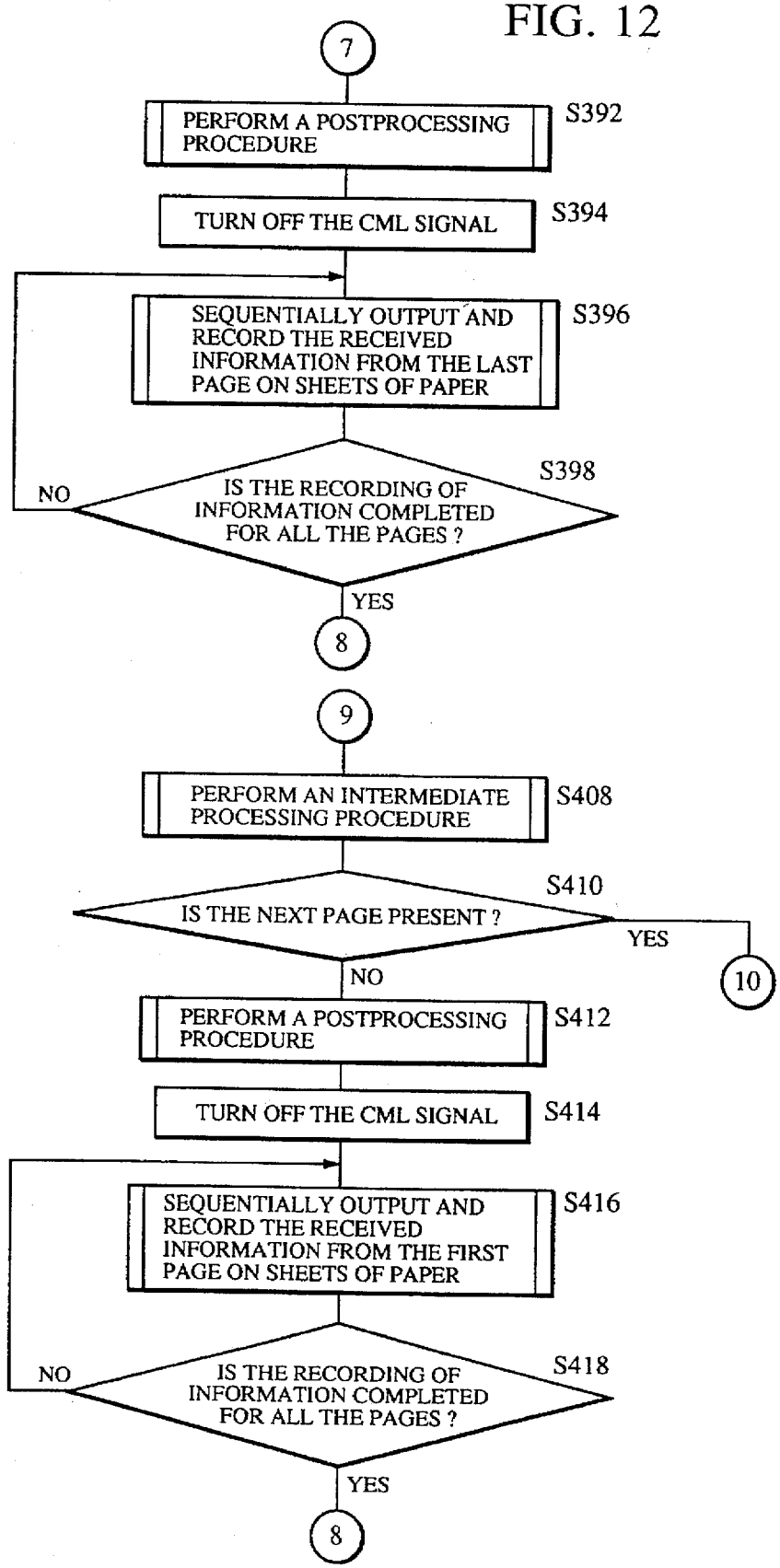
FIG. 12 is a flow chart for explaining the operation of the facsimile apparatus according to the fourth embodiment.

FIGS. 11 to 12 are flow charts showing a control procedure to be executed by the control circuit 254 in the fourth embodiment.

First, in step S362, assume that the signal having a signal level of "0" is output onto the signal line 254a so that the CML signal is turned off, and in step S364, by generating the clear pulse on the signal line 2541, it is indicated to a receiver that there is not selected the instruction not to execute the software sorting operation as the setting of a transmitter side.

Next, in step S366, a signal having a signal level of "0" is output on the signal line 254g so that it is set that the software sorting operation is executed. In step S368, information on the signal lines 236a, 242a, 246a, 247a is input to determine whether or not the registration of a sender for which it is unnecessary to execute the software sorting operation is selected. If the selection is made, the control proceeds to step S370 to register the sender unnecessary to execute the software sorting operation in the registering circuit 230. If the selection is not made, the control proceeds to step S372 to determine whether or not the reception is selected. If the reception is selected the control goes to step S376, and if the reception is not selected the control goes to a step S374 to perform another type of processing.

In step S376, the signal having a signal level of "1" is output onto the signal line 254a, so that the CML signal is turned on and in step S378 a preprocessing procedure is performed. In step S380, it is determined whether or not the sender's telephone number identified based on the TSI signal is registered in the registering circuit 230. If the sender's telephone number is registered, the control goes to step S400 to record information each time the information is received for one page and if the sender's telephone number is not registered, the control goes to step S382 to record the information after the software sorting operation is executed when the information has been received for one communication.

In step S382, a remaining preprocessing procedure is executed, and in step S384, the received information is stored in the memory circuit 224 via the signal line 254c.

In step S386, it is determined whether or not the reception of the information for one page is completed. If the reception of the information for one page is determined to be not completed, the control returns to step S384, and if it is determined to be completed, the control goes to step S388 to perform an intermediate processing procedure. In step S390 it is determined whether or not the next page is present. If the next page is determined to be present, the control returns to step S384, and if the next page is determined to be not present, the control proceeds to step S392 where a postprocessing procedure is performed.

Next, in step S394 a signal having the signal level of "0" is output onto the signal line 254a so that the CML signal is turned off, and in a step S396 the information stored in the memory circuit via the signal line 254c is sequentially read out of the memory circuit from the last page to record the information software-sorted.

In step S398, it is determined whether or not the recording of all the pages is completed. If the recording of all the pages is determined to be not completed, the control returns to step S396 to continue the processing, and if it is determined to be completed, the control returns to the standby state of step S368.

Step S400 represents a remaining preprocessing procedure and in a subsequent step S402 the received information is stored in the memory circuit 224 via the signal line 254c. Then, if the received information for one page is stored in the memory circuit 224 via the signal line 254c, the information is recorded in step S404.

In step S406, it is determined whether or not the reception of the information for one page is completed. If the reception of the information for one page is determined to be not completed, the control returns to the step S402 to continue the processing, and if it is determined to be completed, the control goes to step S408 to perform an intermediate processing procedure. In step S410, it is determined whether or not the next page is present. If the next page is determined to be present, the control returns to step S402 to continue the processing for the next page and if the next page is determined to be not present, the control proceeds to step S412 where a postprocessing procedure is performed.

Next, in step S414 a signal having the signal level of "0" is output onto the signal line 243a so that the CML signal is turned off and in step S416 the information storede in the memory circuit 224 via the signal line 243c is sequentially read out of the memory circuit 224 from the first page to record the read information.

In step S418 it is determined whether or not the recording of all the pages is completed. If the recording of all the pages is determined to be not completed, the control returns to continue the processing of the S416 operation, and if it is determined to be completed, the control goes to the standby state (the step S368).

In the above fourth embodiment, there is registered a telephone number of a sender for which it is unnecessary to execute the software sorting operation. However, as a modification instead of the embodiment, an abbreviated name of a sender for which it is unnecessary to execute the software sorting operation may be registered, or a subaddress for which it is unnecessary to execute the software sorting operation may be registered in communication in which the subaddress is designated.

Because in the facsimile apparatus in which each recorded sheet is ejected in a faceup state, the received information is considered to be recorded by the LBP, the received information from a sender for which it is unnecessary to execute the software sorting operation is recorded at an even speed after the information has been received for one page. However, if the LBP is not employed, the information may be recorded in real time.

Next, a fifth embodiment will be described below, in which one or more times when it is set that the information start to be recorded each time the information is received for one page (one or more times when the software sorting operation is stopped) and one or more times when the setting is released (one or more times when the software sorting operation is started) are registered, the information is recorded each time the information is received for one page only during a time zone from the software sorting operation start time to the software sorting operation stop time, and the software sorting operation is performed excluding the time zone, as described above.

Figure 13:
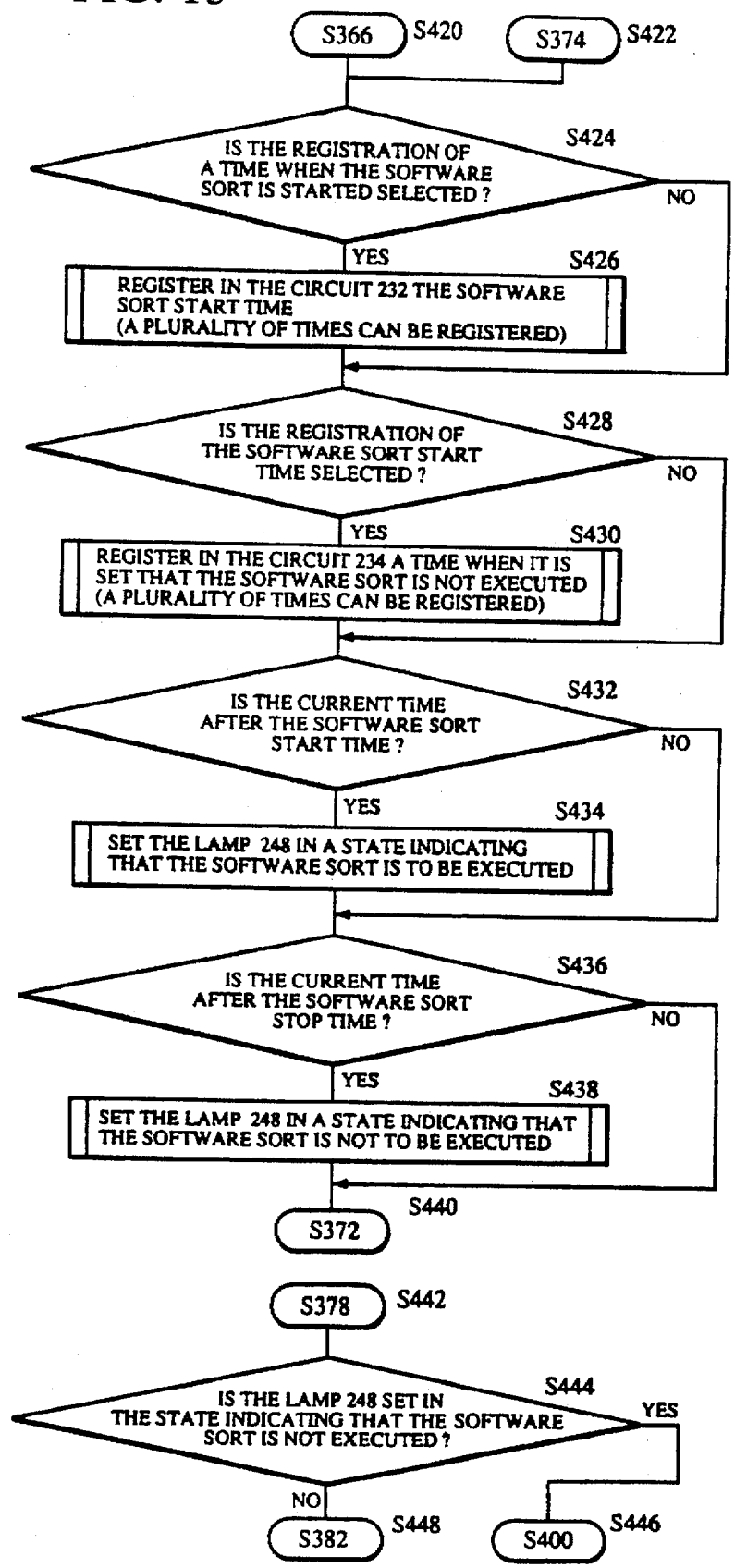
FIG. 13 is a flow chart for explaining the operation of the facsimile apparatus according to a fifth embodiment of the present invention.

FIG. 13 is a flow chart showing the portion of the operation in the fifth embodiment which is different from that in the above fourth embodiment (FIGS. 11 and 12).

First, steps S420 and S422 represent the steps S366 and S374, respectively. In a subsequent step S424, various types of information on the signal lines 238a, 242a, 244a, 246a and 247a are input to determine whether or not the registration of a software sorting operation start time is selected. If the registration is determined to be selected, the control proceeds to step S426 where the start time is registered in the registering circuit 232, and then the control proceeds to step S428. Ten start times can be registered in the registering circuit 232. If the registration is determined to be not selected, the control proceeds directly to step S428.

In step S428, various types of information on the signal lines 240a, 242a, 244a, 246a and 247a are input to determine whether or not the registration of a software sorting operation stop time is selected. If the registration is determined to be selected, the control proceeds to step S430 where the top time is registered in the registering circuit 234, and then the control proceeds to step S432. Ten stop times can be registered in the registering circuit 234. If the registration is determined to be not selected, the control proceeds directly to step S432.

In step S432, it is determined whether or not the current time is coincident with any one of the software sorting operation start times registered in the registering circuit 232. If the current time is determined to be coincident, the control proceeds to step S434 where a signal having a signal level of "0" is output on the signal line 254j so that the lamp 248 is set to indicate that the software sorting operation is to be performed, whereas, if the current time is determined to be incoincident, the control proceeds to step S436.

In the step S436, it is determined whether or not the current time is coincident with any one of the software sorting operation stop times registered in the registering circuit 234. If the current time is determined to be coincident, the control proceeds to a step S438 where a signal having a signal level of "0" is output on the signal line 254j so that the lamp 248 is set to indicate that the software sorting operation is not to be performed, and then the control proceeds to a step S440 (S372). If the current time is determined not to be coincident, the control proceeds directly to a step S440 (S372).

Step S442 represents step S378. In step S444, it is determined whether or not the lamp 248 is set to indicate that the software sorting operation is not to be performed. If the software sorting operation is not to be performed, the control proceeds to a step S446 (S400) while if the operation is to be performed, the control proceeds to a step S448 (S382).

It should be noted that when a logical OR operation is performed between the fifth embodiment and the above fourth embodiment (including the modifications), it may be set so as not to perform the software sorting operation. That is, the information may be recorded each time the information is received for one page when the information is transmitted from a sender for which it is which is registered as a sender unnecessary to execute the software sorting operation, or when it is set that the information is to be recorded each time the information is received for one page.

In addition, in the above fifth embodiment, the facsimile apparatus is described in which the software sorting operation start and stop times are registered and a mode is switched at each of the times. However, consideration of Sunday and holiday may be taken into the fifth embodiment.

Next, a sixth embodiment will be described below in which a sender includes means for selecting whether or not it is set that the received information is output without performing the software sorting operation in received page order, and means for informing a receiver of the selection, in a preprocessing procedure. In response to the information, the receiver records the information each time the information is received for one page.

Figure 14:
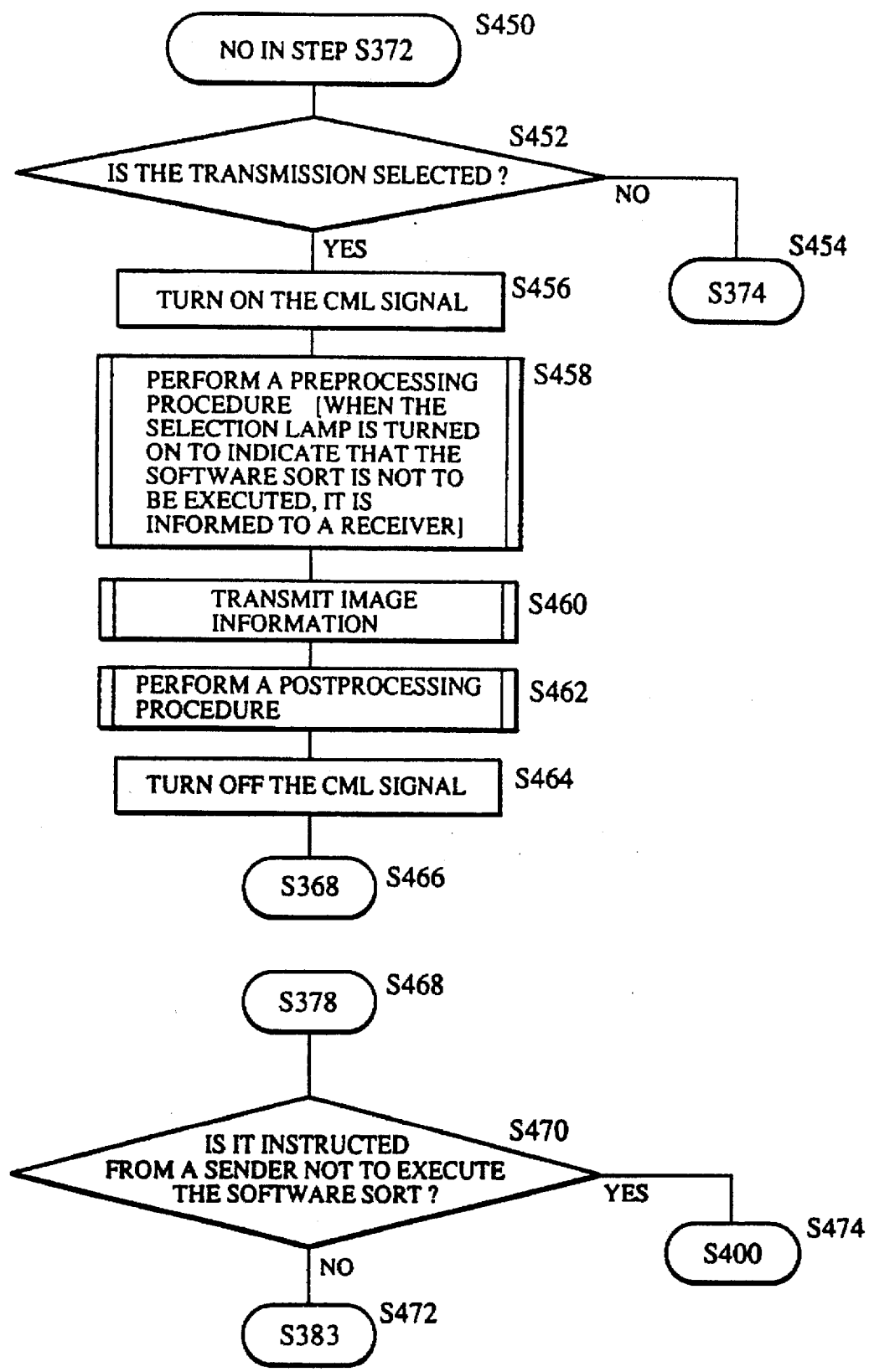
FIG. 14 is a flow chart for explaining the operation of the facsimile apparatus according to a sixth embodiment of the present invention.

FIG. 14 is a flow chart showing the portion of the operation in the sixth embodiment which is different from that in the above fourth embodiment (FIGS. 11 and 12).

First, step 450 represents the above step S372. In step S452 it is determined whether or not transmission is selected. If the transmission is determined to be selected, the control proceeds to step S456, while if not the control proceeds to step S454 (S374).

In step S456, a signal having a signal level of "1" is output onto the signal line 254a so that the CML signal is turned on. In step S458, the preprocessing procedure is performed. When the signal on the signal line 252a is input and it is determined to be the signal level of "1", i.e., when the lamp 252 is turned on to indicate that the software sorting operation is not executed, it is informed to the receiver that the software sorting operation is not executed.

Then, in step S460, image information is transmitted, and in step S462 a postprocessing procedure is performed. In step S464, a signal having a signal level of "0" is output onto the signal line 254a so that the CML signal is turned off. Subsequently, the control returns to the standby state (S368) in step S466.

In addition, step S468 represents the preprocessing procedure of the above step S378. In this preprocessing procedure, it is determined whether or not an instruction is transmitted from the sender to output the information without performing the software sorting operation (step S470). If the instruction is determined to be transmitted, the control proceeds to a step S474 (S400), while if not the control proceeds to a step S472 (S383).

In the sixth embodiment, it is assumed that the software sorting operation is not instructed when information is transmitted of slips having less relation between pages. In this case, because paging is unnecessary in the information of slips having less relation between pages, information of a transmission source may not be transmitted. Therefore, a transmission time can be decreased by a time period required for transmission of the transmission source information. In addition, the image information can be obtained because there is no sort of the image information because of the transmission source information.

As described above, according to the present invention, the software sorting operation is possible and the received information can be arranged and output in correct page order. In addition, the recorded sheets of paper can be classified and output for every predetermined sender only when the sender can be identified and determined to be a preregistered specific sender. Therefore, erroneous classifying processing can be avoided and it is possible for the operator to easily classify and distribute the recorded sheets, providing an easily operable apparatus.

In addition, in a facsimile apparatus in which each of the recorded sheets is output in a faceup state, even if the sheets recorded in a correct order and those recorded in a reverse order are mixed, because the output method can be changed, the operator can easily recognized this, without confusion, resulting in providing an easily operable apparatus.

Further, when there is received information which has no relation between pages, as in many slips, and is preferably recorded each time the information is received for one page, the information is recorded in received page order immediately without performing the software sorting operation by specifying a sender or a time zone or based on the instruction from the sender. Therefore, the information of slips can be obtained from the first page without performing the software sorting operation so that the subsequent processing can be also performed, providing an easily operable apparatus.

What is claimed is:

1. An image receiving apparatus comprising:
   storing means for storing images which are sequentially received starting with a first page;
   first control means for controlling reading out of the images stored in said storing means sequentially starting with a last page of the images after the last page is stored in said storing means;
   determining means for determining whether all of the images to be received can be stored in said storing means, said determining means making said determination while said storing means is storing the received images;
   second control means for controlling reading out of the images stored in said storing means sequentially starting with the first page before receiving the last page when said determining means determines that all of the images cannot be stored in said storing means; and
   recording means for recording the images read out by either said first or second control means and ejecting the recorded images in a face-up state.

2. An image receiving apparatus according to claim 1, wherein said determining means includes means for determining that a remaining amount of storage area of said storing means is less than a predetermined amount.

3. An image receiving apparatus according to claim 1, further comprising:
   classifying means for classifying sheets recorded by said recording means into recorded sheets on which the images are recorded starting with the last page and recorded sheets on which the images are recorded starting with the first page.

4. An image receiving apparatus according to claim 1, further comprising:
   binding means for binding the sheets on which the images are recorded starting with the last page by said recording means, the sheets on which the images are recorded starting with the first page not being bound.

5. An image receiving apparatus comprising:
   storing means for storing images which are sequentially received starting with a first page;
   determining means for determining whether a predetermined condition has been met;
   recording means for reading out an image stored in said storing means, for recording the read-out image on a sheet, and for ejecting the recorded sheet in a face-up state,
   said recording means having a first mode in which it successively performs recording starting with a last page and a second mode in which it successively performs recording starting with the first page, and
   said recording means selecting one of the first mode and the second mode in accordance with the result of determination performed by said determining means; and
   binding means for binding the sheets on which the images are recorded starting with the last page by said recording means, the sheets on which the images are recorded starting with the first page not being bound.

6. An image receiving method comprising the steps of:
   a storing step for storing images which are sequentially received, starting with a first page, in a storage medium;
   a first control step for controlling reading out of the images stored in said storing step sequentially starting with a last page of the images after the last page is stored in said storing step;
   a determining step for determining whether all of the images to be received can be stored in the storing step, said determining step making said determination while said storing step is storing the received images;
   a second control step for controlling reading of out the images stored in said storing means sequentially starting with the first page before receiving the last page when said determining step determines that all of the images cannot be stored in said storing step; and
   a recording step for recording the images read out by either said first or second control step and ejecting the recorded images in a face-up state.

7. An image receiving method according to claim 6, wherein the determining step includes a determination that a remaining area of the storage medium of the storing step is less than a predetermined amount.

8. An image receiving method according to claim 6, further comprising:
a classifying step for classifying sheets recorded in the recording step into recorded sheets on which the images are recorded starting with the last page and recorded sheets on which the images are recorded starting with the first page.

9. An image receiving method according to claim 6, further comprising:
a binding step for binding the sheets on which the images are recorded starting with the last page by the recording step, the sheets on which the images are recorded starting with the first page not being bound.

10. An image receiving method comprising the steps of:
a storing step for storing images which are sequentially received, starting with a first page, in a storage medium;
a determining step for determining whether a predetermined condition has been met;
a recording step for reading out an image stored in the storage medium in the storing step, recording the read-out image on a sheet, and ejecting the recorded sheet in a face-up state,
the recording step having a first mode in which it successively performs recording starting with a last page and a second mode in which it successively performs recording starting with the first page, and
the recording step selecting one of the first mode and the second mode in accordance with the result of the determination made in the determining step; and
a binding step for binding the sheets on which the images are recorded starting with the last page by the recording step, the sheets on which the images are recorded starting with the first page not being bound.

11. An image receiving apparatus comprising:
storing means for storing images which are sequentially input in an input page order;
first control means for controlling reading out of the images stored in said storing means sequentially in a reverse page order reversed with respect to the input page order after all the input images are stored by said storing means;
determining means for determining whether all of the images to be input can be stored in said storing means, said determining means making said determination while said storing means is storing the input images;
second control means for controlling reading out of the stored images sequentially in the input page order in said storing means before all the images to be input are stored in said storing means when said determining means determines that all of the images to be input cannot be stored in said storing means; and
output means for outputting the images read out by either said first or second control means.

12. An image receiving apparatus according to claim 11, further comprising:
classifying means for classifying sheets recorded by said recording means into recorded sheets on which the images are recorded in said first mode and recorded sheets on which the images are recorded in said second mode.

13. An image receiving apparatus according to claim 11, further comprising:
binding means for binding the sheets sequentially arranged starting with the first page, the sheets sequentially arranged starting with the last page not being bound.

14. An image receiving apparatus comprising:
storing means for storing images which are sequentially received;
recording means for recording the images stored in said storing means on sheets and for ejecting the sheets;
binding means for binding sheets ejected by said recording means;
first control means for controlling reading out of the images stored in said storing means in a predetermined page order and the recording of the read out images by said recording means so that the sheets ejected by said recording means are stacked and arranged according to said predetermined page order;
second control means for controlling reading out of the images stored in said storing means in a page order different from said predetermined page order and recording the images read out by said recording means; and
third control means for controlling said binding means so that the sheets recorded under the control of said first control means are bound in said binding means and the sheets recorded under the control of said second control means are not bound in said binding means.

15. An image receiving method comprising the steps of:
a storing step for storing images, which are sequentially input in an input page order, in a storage medium;
a first control step for controlling reading out of the images stored in said storing step sequentially in a reverse page order reversed with respect to the input page order after all the input images are stored by said storing step;
a determining step for determining whether all of the images to be input can be stored in the storage medium, said determining step making said determination while said storing step is storing the input images;
a second control step for controlling reading out of the stored images sequentially in the input page order stored in said storing step before all the images to be input are stored in said storing step when said determining step determines that all of the images to be input cannot be stored in said storing step; and
output step for outputting the images read out by either said first or second control step.

16. An image receiving method according to claim 15, further comprising:
a classifying step for classifying sheets recorded by the recording step into recorded sheets on which the images are recorded in the first mode and recorded sheets on which the images are recorded in the second mode.

17. An image receiving method according to claim 15, further comprising:
a binding step for binding the sheets sequentially arranged starting with the first page, the sheets sequentially arranged starting the last page not being bound.

18. An image receiving method comprising the steps of:
a storing step for storing images, which are sequentially received, in a storage medium;

a recording step for recording the images stored in the storing medium in the storing step on sheets and for ejecting the sheets;

a binding step for binding sheets ejected by said recording step;

a first control step for controlling reading out of the images stored in said storing step in a predetermined page order and the recording of the read out images by said recording step so that the sheets ejected by said recording step are stacked and arranged according to the predetermined page order a second control step for controlling reading of out the images stored in said storing step in a page order different from the predetermined page order and recording the images read out by said recording step; and a third control step for controlling said binding step so that the sheets recorded under the control of said first control are bound in said binding step and the sheets recorded under the control of said second control step are not bound in said binding step.

* * * * *

UNITED STATES PATENT AND TRADEMARK OFFICE
CERTIFICATE OF CORRECTION

PATENT NO. : 5,682,248
DATED : October 28, 1997
INVENTOR(S) : TAKEHIRO YOSHIDA

It is certified that error appears in the above-indentified patent and that said Letters Patent is hereby corrected as shown below:

<u>ON TITLE PAGE AT [57] ABSTRACT</u>

Line 11, "can not" should read --cannot--.

<u>SHEET 3</u>

Figure 3, "SFGNAL" should read --SIGNAL--.

<u>COLUMN 1</u>

Line 16, "the" should be deleted;
Line 17, "apparatus" should be deleted;
Line 21, "from" should read --from a--;
Line 28, "(Laser" should read --(laser--.

<u>COLUMN 3</u>

Line 16, "circuit 8" should read --circuit 8 consists of--.

<u>COLUMN 5</u>

Line 66, "state" should read --stage--.

<u>COLUMN 6</u>

Line 3, "state" should read --stage--;
Line 5, "state" should read --stage--;
Line 11, "state" should read --stage--;
Line 48, "contrary," should read --other hand,--;
Line 49, "remained" should read --remaining--.

UNITED STATES PATENT AND TRADEMARK OFFICE
CERTIFICATE OF CORRECTION

PATENT NO. : 5,682,248
DATED : October 28, 1997
INVENTOR(S) : TAKEHIRO YOSHIDA

It is certified that error appears in the above-indentified patent and that said Letters Patent is hereby corrected as shown below:

COLUMN 7

Line 13, "outputted" should read --output--;
Line 17, "outputted" should read --output--;
Line 27, "control proceeds" and "a" should be deleted;
Line 65, "of" should be deleted. (2nd occur.)

COLUMN 9

Line 36, "does not store" should read --not storing--;
Line 38, "outputted" should read --output--;
Line 40, "outputted" should read --output--;
Line 42, "outputted" should read --output--;
Line 56, "outputted" should read --output--;
Line 57, "outputted" should read --output--.

COLUMN 10

Line 16, "outputted" should read --output--;
Line 23, "remained" should read --remaining--;
Line 26, "remained" should read --remaining--;
Line 28, "the" (first occurrence) should be deleted;
Line 33, "a" should be deleted.

UNITED STATES PATENT AND TRADEMARK OFFICE
CERTIFICATE OF CORRECTION

PATENT NO. : 5,682,248
DATED : October 28, 1997
INVENTOR(S) : TAKEHIRO YOSHIDA

It is certified that error appears in the above-indentified patent and that said Letters Patent is hereby corrected as shown below:

COLUMN 11

Line 22, "outputted" should read --output--;
Line 38, "And on" should read --On--.

COLUMN 12

Line 38, "outputted" should read --output--;
Line 39, "drawback" should read --drawback in--;
Line 45, "outputted" should read --output--.

COLUMN 13

Line 22, "pick up" should read --pickup--.

COLUMN 15

Line 7, "outputted" should read --output--;
Line 23, "outputted" should read --output--;
Line 38, "outputted" should read --output--;
Line 40, "control" should read --controls--.

COLUMN 16

Line 61, "the" should be deleted.

COLUMN 17

Line 13, "the" should be deleted.

UNITED STATES PATENT AND TRADEMARK OFFICE
CERTIFICATE OF CORRECTION

PATENT NO. : 5,682,248
DATED : October 28, 1997
INVENTOR(S) : TAKEHIRO YOSHIDA

It is certified that error appears in the above-indentified patent and that said Letters Patent is hereby corrected as shown below:

COLUMN 18

Line 9, "the" (first occurrence) should be deleted;
Line 13, "a" (first occurrence) should be deleted;
Line 17, "a" should be deleted;
Line 25, "a" should be deleted;
Line 32, "for which it is" should be deleted;
Line 33, "sender" should read --sender for which it is--.

COLUMN 19

Line 10, "a" should be deleted;
Line 11, "a" should be deleted;
Line 37, "recognized" should read --recognize--.

COLUMN 20

Line 55, "of out" should read --out--.

COLUMN 23

Line 11, "order" should read --order;--.

UNITED STATES PATENT AND TRADEMARK OFFICE
CERTIFICATE OF CORRECTION

PATENT NO. : 5,682,248
DATED : October 28, 1997
INVENTOR(S) : TAKEHIRO YOSHIDA

It is certified that error appears in the above-indentified patent and that said Letters Patent is hereby corrected as shown below:

<u>COLUMN 24</u>

Line 1, "of out" should read --out--.

Signed and Sealed this

Fourth Day of August, 1998

Attest:

BRUCE LEHMAN

Attesting Officer

Commissioner of Patents and Trademarks